(12) United States Patent
Quan et al.

(10) Patent No.: US 10,999,890 B2
(45) Date of Patent: May 4, 2021

(54) DATA PROCESSING METHOD, APPARATUS, AND SYSTEM

(71) Applicant: Huawei Technologies Co., Ltd., Shenzhen (CN)

(72) Inventors: Wei Quan, Beijing (CN); Jian Zhang, Beijing (CN); Bingzhao Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/371,903

(22) Filed: Apr. 1, 2019

(65) Prior Publication Data
US 2019/0230736 A1    Jul. 25, 2019

Related U.S. Application Data

(63) Continuation of application No. PCT/CN2017/105044, filed on Sep. 30, 2017.

(30) Foreign Application Priority Data

Sep. 30, 2016 (CN) .......................... 201610873599.9

(51) Int. Cl.
*H04W 80/02* (2009.01)
*H04W 80/08* (2009.01)
(Continued)

(52) U.S. Cl.
CPC .......... *H04W 80/02* (2013.01); *H04L 1/0084* (2013.01); *H04L 5/0044* (2013.01); *H04L 29/06* (2013.01);
(Continued)

(58) Field of Classification Search
CPC ..... H04W 80/02; H04W 28/06; H04W 80/08; H04W 76/11; H04W 28/065; H04L 29/06;
(Continued)

(56) References Cited

U.S. PATENT DOCUMENTS

| 6,788,944 B2 | 9/2004 | Jiang |
| 2005/0213605 A1 | 9/2005 | Kim et al. |

(Continued)

FOREIGN PATENT DOCUMENTS

| CN | 101171806 A | 4/2008 |
| CN | 101222484 A | 7/2008 |

(Continued)

OTHER PUBLICATIONS

Texas Instruments Inc, "PDCP-RLC-MAC Header Formats", 3GPP TSG-RAN WG2 Meeting #58bis, R2-072511, Orlando, Florida, USA, Jun. 25-29, 2007, 7 pages.

(Continued)

*Primary Examiner* — Thai Nguyen
(74) *Attorney, Agent, or Firm* — Leydig, Voit & Mayer, Ltd.

(57) ABSTRACT

A data processing method by a data sending apparatus is described. The method includes receiving a data packet from a PDCP layer, where the data packet is used as an RLC SDU. The method further includes encapsulating the RLC SDU into at least one RLC PDU, where each one of the at least one RLC PDU includes a header and a payload. The payload carries data from a single RLC SDU. It can be learned that a transmit end no longer performs concatenation processing at the RLC layer on the data packet. In this way, concatenation processing at the transmit end is reduced, and processing complexity and processing latency are further (Continued)

reduced. In addition, processing at a receive end also becomes simpler and more efficient.

19 Claims, 9 Drawing Sheets

(51) Int. Cl.
*H04W 76/11* (2018.01)
*H04L 1/00* (2006.01)
*H04L 5/00* (2006.01)
*H04L 29/06* (2006.01)
*H04W 28/06* (2009.01)

(52) U.S. Cl.
CPC ............ *H04W 28/06* (2013.01); *H04W 76/11* (2018.02); *H04W 80/08* (2013.01)

(58) Field of Classification Search
CPC ..... H04L 1/0084; H04L 5/0044; H04L 69/22; H04L 69/32
See application file for complete search history.

(56) References Cited

U.S. PATENT DOCUMENTS

| | | |
|---|---|---|
| 2007/0060139 A1 | 3/2007 | Kim et al. |
| 2007/0253447 A1 | 11/2007 | Jiang |
| 2008/0186946 A1 | 8/2008 | Marinier et al. |
| 2008/0226074 A1 | 9/2008 | Sammour et al. |
| 2008/0310452 A1 | 12/2008 | Vedantham et al. |
| 2009/0003283 A1* | 1/2009 | Meylan ............... H04L 1/008 370/331 |
| 2009/0046631 A1 | 2/2009 | Meylan et al. |
| 2009/0175173 A1 | 7/2009 | Kim et al. |
| 2009/0290598 A1* | 11/2009 | Pani .................. H04L 5/0055 370/473 |
| 2009/0310537 A1 | 12/2009 | Bucknell et al. |
| 2010/0046448 A1 | 2/2010 | Peisa et al. |
| 2011/0019756 A1 | 1/2011 | Chun et al. |
| 2011/0188377 A1* | 8/2011 | Kim ................... H04L 49/9021 370/235 |
| 2015/0201339 A1 | 7/2015 | Yi et al. |
| 2016/0308776 A1 | 10/2016 | Ozturk et al. |
| 2017/0214489 A1* | 7/2017 | Jiang .................... H04L 1/0041 |
| 2017/0310421 A1* | 10/2017 | Froberg Olsson .... H04L 1/1874 |
| 2018/0262950 A1 | 9/2018 | Malkamäki et al. |

FOREIGN PATENT DOCUMENTS

| | | |
|---|---|---|
| CN | 101364990 A | 2/2009 |
| CN | 101370165 A | 2/2009 |
| CN | 101483505 A | 7/2009 |
| CN | 101883389 A | 11/2010 |
| CN | 102104535 A | 6/2011 |
| JP | 2009044674 A | 2/2009 |
| JP | 2010514252 A | 4/2010 |
| JP | 2013179703 A | 9/2013 |
| KR | 20080056733 A | 6/2008 |
| KR | 20090084320 A | 8/2009 |
| KR | 20110099063 A | 9/2011 |
| RU | 2461147 C2 | 9/2012 |
| RU | 2465737 C2 | 10/2012 |
| WO | 2009018786 A1 | 2/2009 |
| WO | 2016080877 A1 | 5/2016 |

OTHER PUBLICATIONS

Intel Corporation, "User plane architecture for NR", 3GPP TSG-RAN WG2 Meeting #95, R2-165006, Gothenburg, Sweden, Aug. 22-26, 2016, 9 pages.

Qualcomm Incorporated, Convida Wireless, "User Plane L2 function analysis", 3GPP TSG-RAN WG2 Meeting #94, R2-164124, Nanjing, China, May 23-27, 2016, 4 pages.

Nokia, Alcatel-Lucent Shanghai Bell, "UP Radio Protocols for NR", 3GPP TSG-RAN WG2, Meeting #94, R2-163439, Nanjing, China, May 23-27, 2016, 4 pages.

Huawei, HiSilicon, "Analysis of L2 protocol functions for NR air interface", 3GPP TSG RAN WG2 Meeting #94, R2-163593, Nanjing, China, May 23-27, 2016, 4 pages.

3GPP TS 36322 V13.2.0 (Jun. 2016); 3rd Generation Partnership Project; Technical Specification Group Radio Access Network; Evolved Universal Terrestrial Radio Access (E-UTRA); Radio Link Control (RLC) protocol specification (Release 13); 45 pages (2016).

ASUSTeK, "Header for PDU segments", 3GPP TSG-RAN WG2 Meeting #59bis, R2-074102, Shanghai, China, Oct. 8-12, 2007, 5 pages.

U.S. Appl. No. 16/434,879, filed Jun. 7, 2019.

PDCP/RLC/MAC PDU structure, 3GPP TSG-RAN WG2 Meeting #55, Seoul, Korea, R2-062754, pp. 1-10, 3rd Generation Partnership Project, Valbonne, France (Oct. 9-13, 2006).

"An approach to the LTE-Advanced Layer 2 development," 3GPP TSG-RAN WG2 Meeting #67, Shenzhen, China, R2-094272, pp. 1-6, 3rd Generation Partnership Project, Valbonne, France (Aug. 24-28, 2009).

"Overall RLC Operation with Higher Layer Sequence Numbers," 3GPP TSG RAN WG2 #56, Riga, Latvia, R2-063182, pp. 1-9, 3rd Generation Partnership Project, Valbonne, France (Nov. 6-10, 2006).

* cited by examiner

DATA PROCESSING METHOD, APPARATUS, AND SYSTEM

CROSS-REFERENCE TO RELATED APPLICATIONS

This application is a continuation of International Application No. PCT/CN2017/105044, filed on Sep. 30, 2017, which claims priority to Chinese Patent Application No. 201610873599.9, filed on Sep. 30, 2016. The disclosures of the aforementioned applications are hereby incorporated by reference in their entireties.

TECHNICAL FIELD

This application relates to the field of communications technologies, and in particular, to a data processing method, apparatus, and system.

BACKGROUND

With development of wireless communications technologies, performance, such as a peak rate and system bandwidth, of a wireless network is improved continuously, and service experience brought to users is getting better and better. Therefore, wireless communication gains increasingly wider application. Expansion of the application of wireless communication brings more service data to the wireless network. Therefore, higher requirements are raised for data processing efficiency of a data transmit end and a data receive end.

SUMMARY

In view of this, this application provides a data processing method, apparatus, and system, so as to improve data processing efficiency.

According to a first aspect, a data processing method is provided. The method is performed by a data sending apparatus and includes the following steps: receiving a data packet from a Packet Data Convergence Protocol (PDCP) layer, where the data packet is used as a Radio Link Control (RLC) service data unit (SDU); and encapsulating the RLC SDU into at least one RLC protocol data unit (PDU), where each the RLC PDU encapsulated at an RLC layer by the data sending apparatus includes a header and a payload, and the payload is used to carry data from a single RLC SDU.

According to a second aspect, a data processing apparatus is provided, located at a transmit end and including means or units configured to perform the steps in the first aspect.

According to a third aspect, a data processing apparatus is provided, including a processor and a memory. The memory is configured to store a program, and the processor invokes the program stored in the memory, to perform the method provided in the first aspect of this application.

According to a fourth aspect, this application provides a data processing apparatus, including at least one processing element (or chip) configured to perform the method in the first aspect.

According to a fifth aspect, this application provides a program. The program is used to perform the method in the first aspect when being executed by a processor.

According to a sixth aspect, a program product is provided, for example, a computer readable storage medium, including the program in the fifth aspect.

According to a seventh aspect, a data processing method is provided. The method is performed by a data receiving apparatus and includes the following steps: receiving, at an RLC layer, a data packet from a MAC layer, where the data packet includes an RLC PDU, the RLC PDU includes a header and a payload, and the payload is used to carry data from a single RLC SDU; and when determining, based on the header of the RLC PDU, that the payload of the RLC PDU is a complete RLC SDU, obtaining the RLC SDU, and sending the RLC SDU to a PDCP layer; and/or when determining, based on the header of the RLC PDU, that the payload of the RLC PDU is a segment of an RLC SDU, obtaining all segments of the RLC SDU, restoring all the segments to the RLC SDU, and sending the RLC SDU to a PDCP layer.

According to an eighth aspect, a data processing apparatus is provided, located at a receive end and including means or units configured to perform the steps in the seventh aspect.

According to a ninth aspect, a data processing apparatus is provided, including a processor and a memory. The memory is configured to store a program, and the processor invokes the program stored in the memory, to perform the method provided in the seventh aspect of this application.

According to a tenth aspect, this application provides a data processing apparatus, including at least one processing element (or chip) configured to perform the method in the seventh aspect.

According to an eleventh aspect, this application provides a program. The program is used to perform the method in the seventh aspect when being executed by a processor.

According to a twelfth aspect, a program product is provided, for example, a computer readable storage medium, including the program in the eleventh aspect.

In the foregoing aspects, that the payload of the RLC PDU is used to carry data from a single RLC SDU means that even if the RLC PDU can accommodate more than one RLC SDU or more than one segment of an RLC SDU, a payload of each the RLC PDU is used to carry only data from a single RLC SDU. In other words, the data sending apparatus does not perform concatenation processing at the RLC layer on data packets.

It can be learned that in a process where the data sending apparatus encapsulates, at the RLC layer, the RLC SDU into the RLC PDU, the payload of each assembled RLC PDU is used to carry the data from a single RLC SDU. In other words, the payload of the RLC PDU does not include data of another RLC SDU. That is, the data sending apparatus no longer performs concatenation processing at the RLC layer on RLC SDUs. In this way, concatenation processing at the transmit end can be reduced, and processing complexity and processing latency can be reduced.

In addition, the receive end may reorder, at the RLC layer, segments of a single RLC SDU only, without a need to reorder RLC SDUs. Therefore, processing at the receive end can be simplified, and processing complexity and processing latency at the receive end can be reduced.

In the foregoing aspects, the header of the RLC PDU includes a segment indicator (SI) field, used to indicate what is encapsulated into the RLC PDU where the SI field is located is a complete RLC SDU or a segment of an RLC SDU.

Optionally, the SI field includes two bits, and values of the SI field are described as follows:

a first value is used to indicate that what is encapsulated into the RLC PDU where the SI field is located is a complete RLC SDU, a second value is used to indicate that what is encapsulated into the RLC PDU where the SI field is located is a first segment of an RLC SDU, a third value is used to indicate that what is encapsulated into the RLC PDU where the SI field is located is a middle segment of an RLC SDU, and a fourth value is used to indicate that what is encapsulated into the RLC PDU where the SI field is located is a last segment of an RLC SDU; or a first value is used to indicate that what is encapsulated into the RLC PDU where the SI field is located is a complete RLC SDU, and a second value is used to indicate that what is encapsulated into the RLC PDU where the SI field is located is a last segment of an RLC SDU.

Optionally, the SI field includes one bit, and values of the SI field are described as follows:

a first value is used to indicate that what is encapsulated into the RLC PDU where the SI field is located is a complete RLC SDU or indicate that what is encapsulated into the RLC PDU where the SI field is located is a last segment of an RLC SDU, and a second value is used to indicate that what is encapsulated into the RLC PDU where the SI field is located is a first segment or a middle segment of an RLC SDU.

In the foregoing aspects, the header of the RLC PDU further includes a segment offset (SO) field, used to indicate a byte offset, of a first byte in a payload of the RLC PDU where the SO field is located, within an RLC SDU to which the payload belongs.

In the foregoing aspects, the header of the RLC PDU further includes a sequence number (SN) field, and when one RLC SDU is encapsulated into a plurality of RLC PDUs, SNs in SN fields in headers of the plurality of RLC PDUs are the same.

Optionally, the SN field may be used to indicate an RLC SDU to which data transmitted in the RLC PDU where the SN field is located belongs.

Optionally, an SN in the SN field is configured by the PDCP layer.

In the foregoing aspects, the header of the RLC PDU further includes a length indicator (LI) field, used to indicate a length of a payload in the RLC PDU where the LI field is located.

In the foregoing aspects, the header of the RLC PDU further includes a data/control field, used to indicate whether a data packet or a control packet is transmitted in the RLC PDU where the data/control field is located.

In the first aspect to the sixth aspect, a process where the data sending apparatus encapsulates the RLC SDU into at least one RLC PDU includes: encapsulating the RLC SDU into the at least one RLC PDU based on an indication from a MAC layer; or encapsulating the RLC SDU into the at least one RLC PDU based on a preset RLC PDU size. Correspondingly, a unit that encapsulates the RLC SDU into the at least one RLC PDU is configured to: encapsulate the RLC SDU into the at least one RLC PDU based on the indication from the MAC layer; or encapsulate the RLC SDU into the at least one RLC PDU based on the preset RLC PDU size.

In the first aspect to the sixth aspect, the data sending apparatus may further send an RLC data packet to the MAC layer. The RLC data packet includes one or more RLC PDUs. Correspondingly, the data processing apparatus further includes a unit that performs this step.

In the first aspect to the sixth aspect, the data sending apparatus uses the RLC data packet as a MAC SDU and encapsulates the MAC SDU into a MAC PDU. The MAC PDU includes a MAC header and a MAC payload, the MAC header includes at least one subheader, each subheader corresponds to one logical channel, the subheader includes a first extension field and a second extension field, the first extension field is used to indicate whether the MAC PDU further includes another subheader or further includes data of another logical channel, and the second extension field is used to indicate whether the MAC PDU further includes other data of a logical channel corresponding to a subheader where the second extension field is located. Correspondingly, the data processing apparatus further includes a unit that performs this step.

In the seventh aspect to the twelfth aspect, when the RLC SDU sent to the PDCP layer does not include a PDCP sequence number, the data receiving apparatus sends the SN in the SN field to the PDCP layer. The PDCP sequence number is a sequence number allocated to the PDCP PDU when the transmit end assembles the PDCP PDU.

In the seventh aspect to the twelfth aspect, when the RLC data packet includes a plurality of RLC PDUs, the data receiving apparatus may distinguish between the RLC PDUs based on the LI field.

In the seventh aspect to the twelfth aspect, when the RLC layer uses an unacknowledged mode (UM), the data receiving apparatus maintains, at the RLC layer, a reordering window, and the data processing method further includes: when a first RLC PDU is out of the reordering window and the first RLC PDU includes a segment of an RLC SDU that fails to be reassembled, discarding, by the data receiving apparatus, all received RLC PDUs corresponding to the RLC SDU that fails to be reassembled. Correspondingly, the data processing apparatus further includes a unit configured to perform this step.

Optionally, the data receiving apparatus may notify the PDCP layer of the discarded RLC SDU. Correspondingly, the data processing apparatus further includes a unit configured to perform this step.

In the seventh aspect to the twelfth aspect, when SNs of received RLC PDUs are discontinuous, the data receiving apparatus starts a timer at a first discontinuous position. The timer may be referred to as an associated timer. Before the timer expires, when RLC PDUs that include missing SNs are received, the data receiving apparatus stops the timer. When the timer expires, that is, RLC PDUs that include missing SNs are not received before the timer expires, the data receiving apparatus moves a lower edge of the reordering window to a position of an SN corresponding to the first discontinuous position, namely, a position of an SN corresponding to a first RLC SDU that is not delivered to an upper layer. The SN is referred to as a first SN.

Optionally, the data receiving apparatus discards an RLC PDU that is not delivered to the PDCP layer and whose SN is before the first SN. Further, optionally, the data receiving apparatus notifies the PDCP layer of an SN of an RLC SDU corresponding to the discarded RLC PDU.

In the seventh aspect to the twelfth aspect, before the receiving, by a data receiving apparatus, a data packet from a MAC layer, the method further includes: obtaining, at the MAC layer, a MAC SDU based on a format of a MAC PDU, and using the MAC SDU as the data packet sent to the RLC layer. The format of the MAC PDU is as follows:

The MAC PDU includes a MAC header and a MAC payload, the MAC header includes at least one subheader, each subheader corresponds to one logical channel, the subheader includes a first extension field and a second extension field, the first extension field is used to indicate whether the MAC PDU further includes another subheader or further includes data of another logical channel, and the second extension field is used to indicate whether the MAC PDU further includes other data of a logical channel corresponding to a subheader where the second extension field is located.

According to a thirteenth aspect, an RLC PDU structure is provided. The RLC PDU includes a header and a payload, and the payload is used to carry data from a single RLC SDU.

The header of the RLC PDU is the same as that in the foregoing descriptions.

According to a fourteenth aspect, a data processing method is provided. The method is performed by a data sending apparatus and includes the following steps: receiving an RLC data packet from an RLC layer, where the RLC data packet includes at least one RLC PDU; and using the RLC data packet as a MAC SDU and encapsulating the MAC SDU into a MAC PDU, where the MAC PDU includes a MAC header and a MAC payload, the MAC header includes at least one subheader, each subheader corresponds to one logical channel, the subheader includes a first extension field (E field) and a second extension field (H field), the first extension field is used to indicate whether the MAC PDU further includes another subheader or further includes data of another logical channel, and the second extension field is used to indicate whether the MAC PDU further includes other data of a logical channel corresponding to a subheader where the second extension field is located.

According to a fifteenth aspect, a data processing method is provided. The method is performed by a data receiving apparatus and includes the following steps: receiving a MAC PDU from a PDCP layer; obtaining a MAC SDU based on a format of the MAC PDU; and sending the MAC SDU to an RLC layer. The format of the MAC PDU is as follows: The MAC PDU includes a MAC header and a MAC payload, the MAC header includes at least one subheader, each subheader corresponds to one logical channel, the subheader includes a first extension field (E field) and a second extension field (H field), the first extension field is used to indicate whether the MAC PDU further includes another subheader or further includes data of another logical channel, and the second extension field is used to indicate whether the MAC PDU further includes other data of a logical channel corresponding to a subheader where the second extension field is located.

According to a sixteenth aspect, a data processing apparatus is provided, located at a transmit end and including means or units configured to perform the steps in the fourteenth aspect. Alternatively, a data processing apparatus is provided, located at a receive end and including means or units configured to perform the steps in the fifteenth aspect.

According to a seventeenth aspect, a data processing apparatus is provided, located at a transmit end and including a processor and a memory. The memory is configured to store a program, and the processor invokes the program stored in the memory, to perform the method provided in the fourteenth aspect of this application. Alternatively, a data processing apparatus is provided, located at a receive end and including a processor and a memory. The memory is configured to store a program, and the processor invokes the program stored in the memory, to perform the method provided in the fifteenth aspect of this application.

According to an eighteenth aspect, this application provides a data processing apparatus, located at a transmit end and including at least one processing element (or chip) configured to perform the method in the fourteenth aspect. Alternatively, this application provides a data processing apparatus, located at a receive end and including at least one processing element (or chip) configured to perform the method in the fifteenth aspect.

According to a nineteenth aspect, this application provides a program. The program is used to perform the method in the fourteenth aspect or the fifteenth aspect when being executed by a processor.

According to a twentieth aspect, a program product is provided, for example, a computer readable storage medium, including the program in the nineteenth aspect.

It can be learned that in the foregoing solutions, only one LCD is needed to indicate data of a single logical channel. Therefore, header overheads at the MAC layer can be effectively reduced.

In the foregoing aspects, the subheader of the MAC PDU further includes a logical channel identifier (LCD) field, used to indicate a logical channel to which a payload associated with the subheader belongs.

In the foregoing aspects, the subheader of the MAC PDU further includes a first length indicator field (F field) and a second length indicator field (L field). The first length indicator field is used to indicate a length of the second length indicator field, and the second length indicator field is used to indicate a length of a payload associated with the subheader where the second length indicator field is located.

According to a twenty-first aspect, a data processing method is provided. The method is used on a data sending apparatus, the data sending apparatus maintains, at a PDCP layer, a PDCP transmit window, and the method includes: sending, at the PDCP layer by the data sending apparatus, PDCP PDUs to an RLC layer; and when a quantity of the sent PDCP PDUs reaches a maximum quantity of PDCP PDUs that can be accommodated by the PDCP transmit window, and the data sending apparatus does not receive a successful feedback at the PDCP layer, stopping, by the data sending apparatus, sending a PDCP PDU. The success feedback is a status report fed back at the RLC layer by the data sending apparatus, indicating that all or some PDCP PDUs are successfully sent, or the success feedback is a status report fed back by a data receiving apparatus, indicating that all or some PDCP PDUs are successfully received.

According to a twenty-second aspect, a data processing apparatus is provided, located at a transmit end and including means or units configured to perform the steps in the twenty-first aspect.

According to a twenty-third aspect, a data processing apparatus is provided, including a processor and a memory. The memory is configured to store a program, and the processor invokes the program stored in the memory, to perform the method provided in the twenty-first aspect of this application.

According to a twenty-fourth aspect, this application provides a data processing apparatus, including at least one processing element (or chip) configured to perform the method in the twenty-first aspect.

According to a twenty-fifth aspect, this application provides a program. The program is used to perform the method in the twenty-first aspect when being executed by a processor.

According to a twenty-sixth aspect, a program product is provided, for example, a computer readable storage medium, including the program in the twenty-fifth aspect.

It can be learned that the transmit end may maintain, at the PDCP layer, a PDCP transmit window, to control data packet sending at the PDCP layer. This can effectively reduce a problem that PDCP SNs are repeated when an amount of data sent by the transmit end exceeds a range of data that can be indicated by the PDCP SN, thereby resolving a problem that a receive end cannot correctly distinguish and process a plurality of data packets that have same SNs and that are received at the PDCP layer.

In the foregoing aspects, a size of the PDCP transmit window is determined based on a PDCP sequence number or is preset.

Further, the size of the PDCP transmit window is determined based on the following formula: $W=(L+1)/2$, where W denotes the size of the PDCP transmit window, and L denotes a value of a maximum sequence number that can be indicated by a length of the PDCP sequence number.

In the foregoing aspects, the data sending apparatus sends, at the PDCP layer, the PDCP sequence number to the RLC layer. The PDCP PDU carries the PDCP sequence number, or the PDCP sequence number is independent of the PDCP PDU. The PDCP sequence number is a sequence number allocated to the PDCP PDU when the data sending apparatus assembles the PDCP PDU.

DESCRIPTION OF EMBODIMENTS

The following clearly describes the technical solutions in the embodiments of this application with reference to the accompanying drawings. Apparently, the described embodiments are merely some but not all of the embodiments of this application. All other embodiments obtained by persons of ordinary skill in the art based on the embodiments of this application without creative efforts shall fall within the protection scope of this application.

In the following description, some terms in this application are described, to help persons skilled in the art have a better understanding.

(1) A terminal, also referred to as user equipment (UE), is a device providing voice and/or data connectivity for a user, for example, a handheld device or an in-vehicle device that have a wireless connection function. Common terminals include, for example, a mobile phone, a tablet computer, a laptop computer, a palmtop computer, a mobile Internet computer (MID), or a wearable device such as a smart watch, a smart band, or a pedometer.

(2) A base station, also referred to as a radio access network (RAN) device, is a device that connects a terminal to a wireless network, including but is not limited to an evolved node B (eNB), a radio network controller (RNC), a node B (NB), a base station controller (BSC), a base transceiver station (BTS), a home eNodeB (for example, Home evolved NodeB or Home Node B, HNB), or a baseband unit (BBU). In addition, the base station may include a Wi-Fi access point (AP) or the like.

(3) A unit (or entity) in this application means a function unit (or entity) or a logical unit (or entity). The unit may be in the form of software and its function is implemented by using a processor to execute program code, or may be in the form of hardware.

(4) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. A scope described by using "above" or "below" includes a boundary point.

Figure 1:
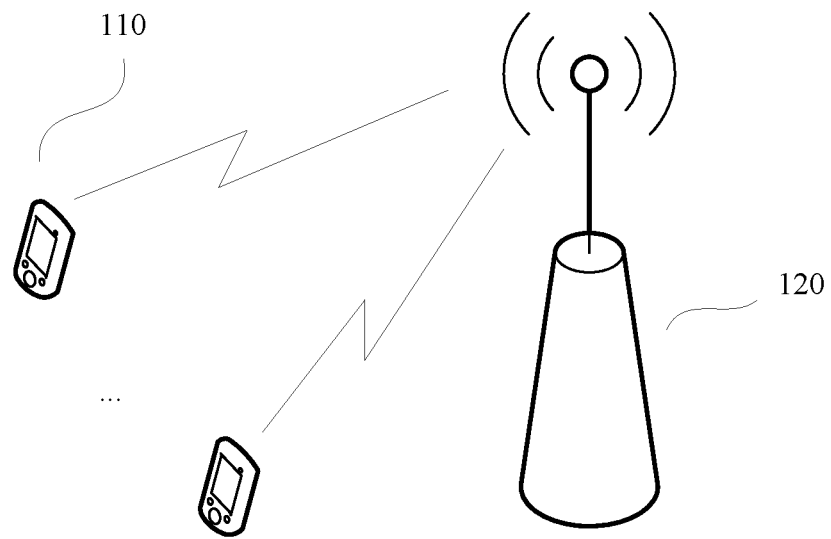
FIG. 1 is a schematic diagram of a communication scenario according to an embodiment of this application.

Referring to FIG. 1, FIG. 1 is a schematic diagram of a communication scenario according to an embodiment of this application. As shown in FIG. 1, a terminal 110 accesses to a wireless network through a RAN device 120, to obtain a service of an external network (for example, the Internet) through the wireless network, or to communicate with another terminal through the wireless network. In a downlink transmission direction, the RAN device 120 is used as a transmit end, and the terminal 110 may be used as a receive end. In an uplink transmission direction, the terminal 110 is used as a transmit end, and the RAN device 120 is used as a receive end.

Figure 2:
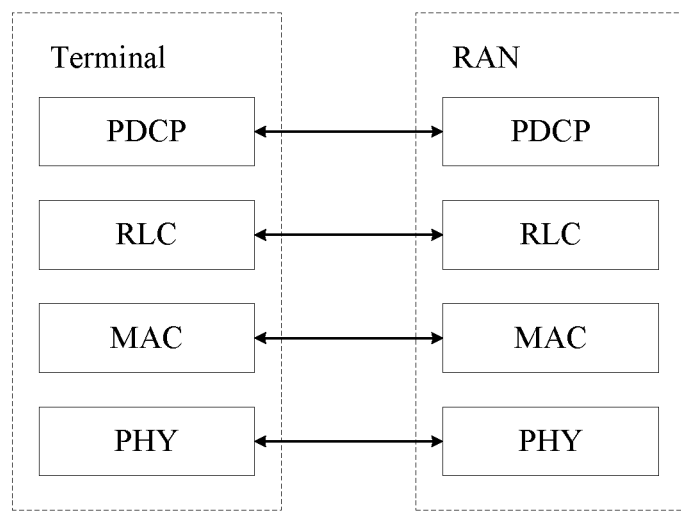
FIG. 2 is a schematic diagram of a user plane protocol stack followed by communication between a terminal and a RAN device according to an embodiment of this application.

Communication between the terminal 110 and the RAN device 120 follows an air-interface protocol. Referring to FIG. 2, FIG. 2 is a schematic diagram of a user plane protocol stack followed by communication between a terminal and a RAN device according to an embodiment of this application. As shown in FIG. 2, the protocol stack includes a Packet Data Convergence Protocol (PDCP) layer, a Radio Link Control (RLC) layer, a Media Access Control (MAC) layer, and a physical (PHY) layer. The PDCP layer, the RLC layer, and the MAC layer form a layer-2 (L2) protocol stack.

Currently, main functions of the PDCP layer include encryption/decryption, header compression/header decompression, integrity protection, and the like. Main functions of the RLC layer include segmentation, concatenation, reordering, automatic repeat request (ARQ), and the like. Main functions of the MAC layer include multiplexing, scheduling, hybrid automatic repeat request (HARD), and the like.

In a solution according to an embodiment of this application, functions of the RLC layer are adjusted, and when encapsulating a data packet from the PDCP layer, the RLC layer performs segmentation only and does not perform concatenation. In this way, concatenation processing at the transmit end can be reduced, and processing complexity and processing latency can be reduced.

The following provides detailed description with reference to the accompanying drawings. It may be understood that a transmit end in this embodiment of this application may also be referred to as a data sending apparatus, and a receive end may also be referred to as a data receiving apparatus.

Figure 3:
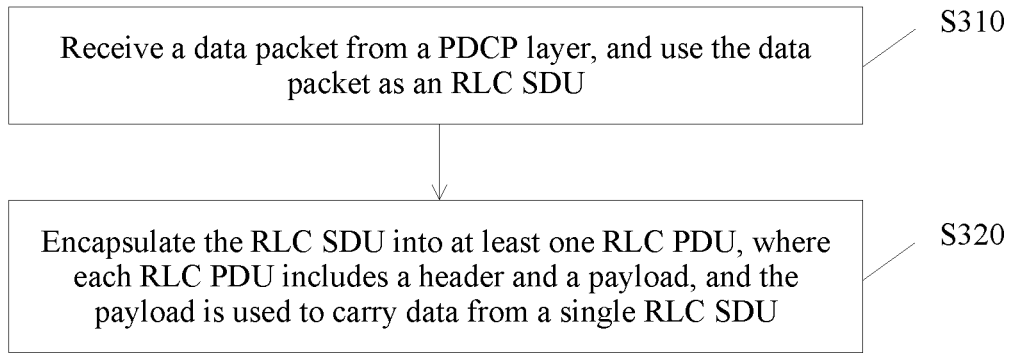
FIG. 3 is a schematic diagram of a data processing method according to an embodiment of this application.

Referring to FIG. 3, FIG. 3 is a schematic diagram of a data processing method according to an embodiment of this application. As shown in FIG. 3, the method is used at a transmit end, that is, performed by the transmit end, and the transmit end may also be referred to as a data sending apparatus. The method includes the following steps:

S310. Receive a data packet from a PDCP layer, and use the data packet as an RLC service data unit (SDU).

S320. Encapsulate the RLC SDU into at least one RLC PDU, where each the RLC PDU includes a header and a payload, and the payload is used to carry data from a single RLC SDU.

In this embodiment and the following embodiments, that the payload of the RLC PDU is used to carry data from a single RLC SDU means that even if the RLC PDU can accommodate more than one RLC SDU or more than one segment of an RLC SDU, a payload of each the RLC PDU is used to carry only data from a single RLC SDU. In other words, the transmit end does not perform concatenation processing at the RLC layer on the data packet.

It can be learned that in a process where the transmit end encapsulates, at the RLC layer, the RLC SDU into the RLC PDU(s), the payload of each assembled RLC PDU is used to carry data from a single RLC SDU. In other words, the payload of the RLC PDU does not include data of another RLC SDU. That is, the transmit end no longer performs concatenation processing at the RLC layer on RLC SDUs. In this way, concatenation processing at the transmit end can be reduced, and processing complexity and processing latency can be reduced.

In addition, the receive end may reorder, at the RLC layer, segments of a single RLC SDU only, without a need to reorder RLC SDUs. Therefore, processing at the receive end can be simplified. This is described in detail in the following embodiments.

When concatenation processing is not performed on the RLC SDU, the header of the RLC PDU may be further simplified to reduce header overheads of the RLC PDU. Certainly, an RLC PDU format in existing technology may still be used, except that larger header overheads are needed as compared with a simplified RLC PDU format in this application.

Figure 4:
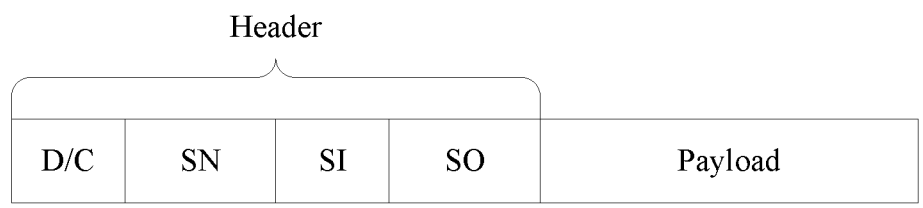
FIG. 4 is a schematic diagram of a format of an RLC PDU according to an embodiment of this application.

Referring to FIG. 4, FIG. 4 is a schematic diagram of a format of an RLC PDU according to an embodiment of this application. As shown in FIG. 4, the RLC PDU includes a header and a payload, and the payload is used to carry data from a single RLC SDU. The header is also referred to as a packet header, including one or more of the following fields: a data/control (D/C) field, a sequence number (SN) field, a segment indicator (SI) field, and a segment offset (SO) field.

The D/C field is used to indicate whether a data packet or a control packet is transmitted or whether data information or control information is transmitted in the RLC PDU where the D/C field is located. For example, when the D/C field is 0, a data packet is transmitted in the RLC PDU, and when the D/C field is 1, a control packet is transmitted in the RLC PDU, or vice versa. That is, when the D/C field is 0, a control packet is transmitted in the RLC PDU, and when the D/C field is 1, a data packet is transmitted in the RLC PDU. This is not limited in this embodiment.

The SN field is used to indicate an RLC SDU to which data transmitted in the RLC PDU where the SN field is located belongs. In existing technology, each RLC PDU corresponds to one SN. In this embodiment, each RLC SDU corresponds to one SN. If one RLC SDU is divided into a plurality of segments and encapsulated into a plurality of RLC PDUs, SNs in these RLC PDUs are the same. It can be learned that in this embodiment, the SN field may be used to indicate a sequence number corresponding to the RLC SDU to which the data transmitted in the RLC PDU where the SN field is located belongs.

It can be learned that one RLC SDU corresponds to one SN, and when one RLC SDU is encapsulated into a plurality of RLC PDUs for transmission, the plurality of RLC PDUs use a same SN. In this way, the PDCP layer and the RLC layer may share one SN to reduce header overheads. In addition, this resolves a problem that an SN length needs to be extended in existing technology because a plurality of SNs is needed when the RLC SDU is segmented into a plurality of RLC PDUs, and therefore can also reduce overheads.

A length of the SN field may be agreed, or may be configured by an upper layer, for example, the radio resource control (RRC) layer. The length of the SN field is not limited in this embodiment and may be configured or agreed based on a need, for example, may be five bits or ten bits.

Optionally, an SN in the SN field may be allocated by the RLC layer. In this case, the RLC PDU and the PDCP PDU include their respective SNs. In other words, one RLC PDU includes two SNs. Optionally, an SN in the SN field may be configured by the PDCP layer. In other words, an SN included in the RLC PDU is an SN allocated by the PDCP layer. In this case, one RLC PDU includes only one SN, and one RLC SDU is encapsulated into a plurality of RLC PDUs that have same SNs. In this way, the PDCP layer and the RLC layer may share one SN to reduce header overheads. In addition, this resolves a problem that an SN length needs to be extended in the existing technology because a plurality of SNs is needed when the RLC SDU is segmented into a plurality of RLC PDUs, and therefore can also reduce overheads.

Optionally, at the transmit end, the SN field may be used to control a position and/or a size of an RLC transmit window, and perform, based on a status report fed back by the receive end, an operation such as ARQ retransmission. At the receive end, the SN field may be used to perform operations such as reordering, status report feedback, and RLC SDU reassembly.

The SI field is used to indicate what is encapsulated into an RLC PDU where the SI field is located is a complete RLC SDU or a segment of an RLC SDU, namely, whether the payload of the RLC PDU is a complete RLC SDU or a segment of an RLC SDU.

In an implementation, the SI field may include two bits. Different values represent different meanings. The following provides an embodiment (embodiment 1).

00: indicates no segmentation. Herein, the segmentation means segmentation performed on an RLC SDU. That is, what is encapsulated into the RLC PDU is a complete RLC SDU.

01: indicates a first segment. That is, what is encapsulated into the RLC PDU is a first segment of an RLC SDU.

10: indicates a middle segment. That is, what is encapsulated into the RLC PDU is a middle segment of an RLC SDU. The middle segment does not include a first byte of the RLC SDU, and does not include a last byte of the RLC SDU. In other words, the middle segment is neither a first segment of the RLC SDU nor a last segment of the RLC SDU.

11: indicates a last segment. That is, what is encapsulated into the RLC PDU is a last segment of an RLC SDU.

In another embodiment (embodiment 2), a correspondence between values of the SI and meanings indicated by the values may be optimized as follows:

00: indicates no segmentation. Herein, the segmentation means segmentation performed on an RLC SDU. That is, what is encapsulated into the RLC PDU is a complete RLC SDU.

01: reserved.

10: reserved.

11: indicates a last segment. That is, what is encapsulated into the RLC PDU is a last segment of an RLC SDU.

The "reserved" herein means that a meaning of the value is temporarily not defined.

In another implementation, the SI field may include one bit. Different values represent different meanings. The following provides an embodiment (embodiment 3).

0: indicates a first segment or a middle segment. That is, what is encapsulated into the RLC PDU is a first segment or a middle segment of an RLC SDU. The middle segment does not include a first byte of the RLC SDU, and does not include a last byte of the RLC SDU. In other words, the middle segment is neither a first segment of the RLC SDU nor a last segment of the RLC SDU.

1: indicates no segmentation or a last segment. Herein, the segmentation means segmentation performed on an RLC SDU. That is, what is encapsulated into the RLC PDU is a complete RLC SDU or what is encapsulated into the RLC PDU is a last segment of an RLC SDU.

It may be understood that a correspondence between each way of value assignment and a meaning indicated by each value in the way of value assignment is not intended to limit this application, and another way of value assignment may be used in the correspondence. For example, more bits are used. For another example, in each way of value assignment, a correspondence between a value and a meaning of the value may be exchanged.

The SO field is used to indicate a byte offset, of a first byte in a payload of the RLC PDU where the SO field is located, within an RLC SDU to which the payload belongs. When the RLC PDU includes a complete RLC SDU, the first byte in the payload of the RLC PDU is a first byte of the RLC SDU, and therefore, the byte offset indicated by the SO field is 0. When the RLC PDU includes a segment of an RLC SDU, the byte offset indicated by the SO field is a byte offset, of a first byte in the segment, within the RLC SDU. For example, a size of an RLC SDU is 400 bytes. It is assumed that the RLC SDU is divided into two 200-byte segments. In an RLC PDU where a first segment is located, a value of the SO field is 0, and in an RLC PDU where a second segment is located, a value of the SO field is 201. When the value of the SO field is 0, the SO field may be spared. In other words, there is no SO field. In this case, it is considered that the RLC PDU includes the complete RLC SDU, or includes the first segment of the RLC SDU.

A length of the SO field is not limited in this application. The length of the SO field may be related to a size of the RLC SDU or a segment of the RLC SDU, or related to a size of the payload of the RLC PDU. When the payload in the RLC PDU is greater, the SO field needs to be longer, but the length of the SO field is not directly proportional to the payload in the RLC PDU. For example, when the SO field includes one bit, a payload size of a maximum RLC PDU that can be indicated is 2; or when the SO field includes two bits, a payload size of a maximum RLC PDU that can be indicated is 4, and so on. When a 200-byte RLC PDU payload needs to be indicated, the length of the SO field needs to be eight bits. The length of the SO field may be agreed, or may be configured by an upper layer, for example, an RRC layer. Alternatively, a field, namely, a length indicator field of the SO field, may be added to the header of the RLC PDU, to indicate the length of the SO field. For example, a 1-bit field may be used to indicate two SO lengths, and a 2-bit field may be used to indicate four SO lengths.

The SI field may be combined with the SO field to indicate specific information of the RLC SDU or a segment of the RLC SDU that is included in the RLC PDU, to facilitate reassembly of the RLC SDU at the receive end.

In correspondence to embodiment 1 to embodiment 3, embodiments of a combination of the SI field and the SO field are as follows:

Embodiment 1

In correspondence to the foregoing embodiment 1, a way of value assignment of the SI field and meanings of values of the SI field are the same as those in the foregoing embodiment 1.

SI=00, and SO=0, or no SO field: indicates no segmentation. Herein, the segmentation means segmentation performed on an RLC SDU. That is, what is encapsulated into the RLC PDU is a complete RLC SDU.

SI=01, and SO=0, or no SO field: indicates a first segment. That is, what is encapsulated into the RLC PDU is a first segment of an RLC SDU.

SI=10 and SO=M, where M>0: indicates a middle segment. That is, what is encapsulated into the RLC PDU is a middle segment of an RLC SDU. A meaning of the middle segment is the same as the foregoing description, and details are not described herein again.

SI=11 and SO=N, where N>0: indicates a last segment. That is, what is encapsulated into the RLC PDU is a last segment of an RLC SDU.

Embodiment 2

In correspondence to the foregoing embodiment 2, a way of value assignment of the SI field and meanings of values of the SI field are the same as those in the foregoing embodiment 2.

SI=00 and SO=0: indicates no segmentation. Herein, the segmentation means segmentation performed on an RLC SDU. That is, what is encapsulated into the RLC PDU is a complete RLC SDU.

SI=11, and SO=N, where N>0: indicates a last segment. That is, the RLC PDU includes a last segment of an RLC SDU.

SI≠00 and SI≠11, for example, SI=01 or SI=10, and SO=M, where M>0: indicates a middle segment. That is, what is encapsulated into the RLC PDU is a middle segment of an RLC SDU. A meaning of the middle segment is the same as the foregoing description, and details are not described herein again.

Embodiment 3

In correspondence to the foregoing embodiment 3, a way of value assignment of the SI field and meanings of values of the SI field are the same as those in the foregoing embodiment 3.

SI=0 and SO=0: indicates a first segment. That is, what is encapsulated into the RLC PDU is a first segment of an RLC SDU.

SI=0 and SO=M, where M>0: indicates a middle segment.

SI=1 and SO=0: indicates no segmentation. Herein, the segmentation means segmentation performed on an RLC SDU. That is, what is encapsulated into the RLC PDU is a complete RLC SDU.

SI=1, and SO=N, where N>0: indicates a last segment. That is, what is encapsulated into the RLC PDU is a last segment of an RLC SDU.

Optionally, the header of the RLC PDU may further include a polling field. The polling field is used to request the RLC layer at the receive end to feed back an RLC status report. The polling field is the same as that in the existing technology, and details are not described herein.

Optionally, the header of the RLC PDU may further include at least one reserved field for subsequent function extension.

In an implementation, the transmit end may assemble, at the RLC layer, the RLC PDU based on an indication from a lower layer, for example, a MAC layer. For example, when a size indicated by the MAC layer can accommodate an RLC SDU plus a corresponding RLC header, the transmit end encapsulates, at the RLC layer, the whole RLC SDU into one RLC PDU. The RLC SDU in the RLC PDU is not segmented, no data of another RLC SDU is concatenated, and there is no padding greater than one byte. In other words, the padding is generated for byte alignment. For another example, when a size indicated by the MAC layer cannot accommodate an RLC SDU plus a corresponding RLC header, the transmit end divides the RLC SDU into a plurality of segments and encapsulates each segment into one RLC PDU. Currently, the MAC layer is used for resource scheduling. A size of a RLC PDU that should assembled by the RLC layer or a total size of plurality of RLC PDUs that should be assembled by the RLC layer may be learned based on a resource scheduling situation of the MAC layer.

In another implementation, a size of the RLC PDU may be preset, so that the transmit end may assemble, at the RLC layer, the RLC PDU based on the preset RLC PDU size. In this case, the RLC layer may assemble the RLC PDU in advance before the MAC layer finishes scheduling or before receiving a size indicated by the MAC layer, and may directly deliver a corresponding quantity of RLC PDUs to the MAC layer after receiving an indication from the MAC layer, so that a real-time processing time of the RLC layer is effectively reduced and a data transmission delay is reduced. The assembly process is similar to the process where the RLC PDU is assembled based on the indication from the MAC layer. For example, when the preset RLC PDU size can accommodate an RLC SDU plus a corresponding RLC header, the transmit end encapsulates, at the RLC layer, the whole RLC SDU into one RLC PDU. The RLC SDU in the RLC PDU is not segmented, and no data of another RLC SDU is concatenated. To enable a size of the assembled RLC PDU to be the same as the preset size, in this case, the transmit end may perform padding at the RLC layer. Alternatively, padding may not be performed, in other words, the preset RLC PDU size is a limit value and is merely used to limit a maximum value of the size of the assembled RLC PDU. For another example, when the preset RLC PDU size cannot accommodate an RLC SDU plus a corresponding RLC header, the transmit end divides the RLC SDU into a plurality of segments and encapsulates each segment into one RLC PDU. The transmit end may segment the RLC SDU based on the preset RLC PDU size, so that all sizes of RLC PDUs formed by segments except a last segment meet the preset RLC PDU size; and for the last segment, when a size of the last segment is insufficient to form an RLC PDU of the preset size, padding may be performed, or padding may not be performed, and this is not limited herein.

Figure 5:
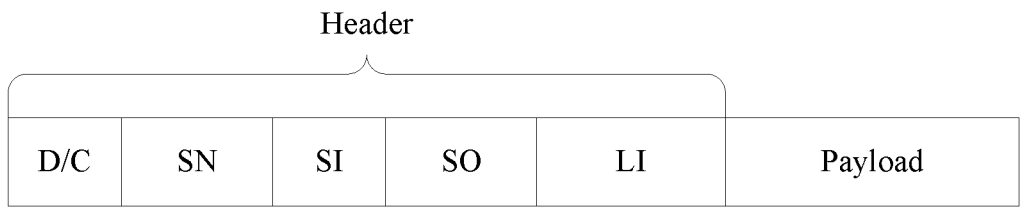
FIG. 5 is a schematic diagram of another format of an RLC PDU according to an embodiment of this application.

Referring to FIG. 5, FIG. 5 is a schematic diagram of another format of an RLC PDU according to an embodiment of this application. A difference from the RLC PDU format shown in FIG. 4 is that this format further includes a length indicator (LI) field, used to indicate a length of a payload in an RLC PDU where the LI field is located. That is, the LI field is used to indicate a length of an SDU or an SDU segment in the RLC PDU where the LI field is located.

Figure 6:
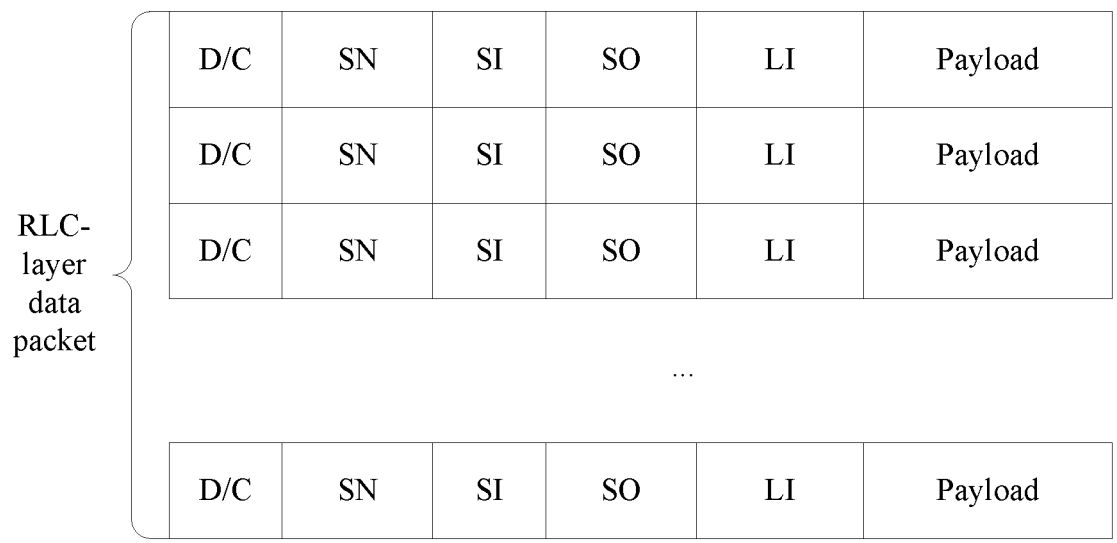
FIG. 6 is a schematic diagram of an RLC data packet according to an embodiment of this application.

Optionally, the transmit end may send, at the RLC layer, the RLC PDUs one by one to the MAC layer. In this case, the MAC layer considers each RLC PDU as one MAC SDU, and sets one subheader for each MAC SDU to indicate the MAC SDU. Alternatively, the transmit end may send, at the RLC layer, a plurality of RLC PDUs as one RLC data packet to the MAC layer, as shown in FIG. 6. The MAC layer uses the RLC data packet as one MAC SDU. Therefore, only one subheader needs to be added to the MAC SDU to indicate the MAC SDU, and header overheads of the MAC layer are reduced. This is described in detail in the following data processing process at the MAC layer, and details are not described herein.

It can be learned that the transmit end sends an RLC data packet to the MAC layer, and the RLC data packet may include one RLC PDU, or may include a plurality of RLC PDUs. In addition, data encapsulated in the RLC PDU included in one RLC data packet may be from one RLC SDU or may be from a plurality of RLC SDUs.

To help persons skilled in the art have a better understanding, the following provides description with reference to processing processes at each layer. However, this is not intended to limit this application. Data processing units or entities at various layers in this application may be located on different devices on a RAN side.

Figure 7:
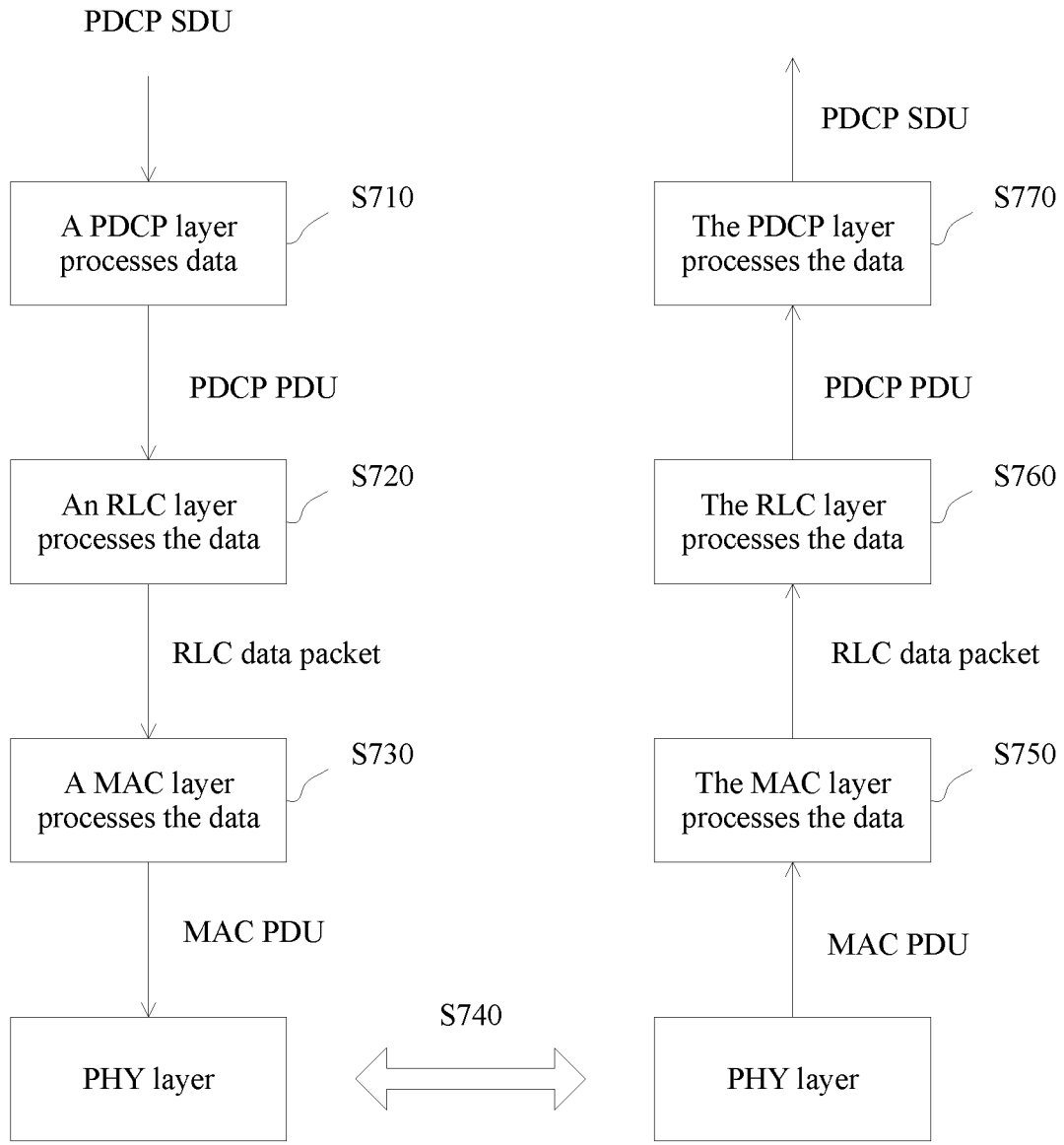
FIG. 7 is a flowchart of a data processing method according to an embodiment of this application.

Referring to FIG. 7, FIG. 7 is a flowchart of a data processing method according to an embodiment of this application. As shown in FIG. 7, the method includes the following steps.

S710. Upper-layer data (a PDCP SDU) reaches a PDCP layer. At the PDCP layer, a transmit end processes the data to form a PDCP PDU, and sends the PDCP PDU to an RLC layer.

The data processing performed at the PDCP layer by the transmit end may include one or more operations such as header compression, encryption, and integrity protection. This is the same as that in the existing technology. Details are not described herein.

Optionally, the transmit end allocates one SN to the PDCP PDU or associates one SN with the PDCP PDU at the PDCP layer. The SN may be encapsulated into the PDCP PDU to be sent to the RLC layer. Alternatively, the SN is not encapsulated into the PDCP PDU, but is sent with the PDCP PDU to the RLC layer. Alternatively, the SN is not encapsulated into the PDCP PDU, but is separately sent to the RLC layer, and signaling is used to indicate a correspondence between the SN and the PDCP PDU, that is, indicate a specific PDCP PDU to which the SN is allocated. To distinguish between the SN and an RLC-layer SN, this SN is referred to as a PDCP SN. The PDCP SN may be the same as the RLC-layer SN or different from the RLC-layer SN.

Optionally, the transmit end may maintain, at the PDCP layer, a PDCP transmit window, to control data packet sending at the PDCP layer. This can effectively reduce a problem that PDCP SNs are repeated when an amount of data sent by the transmit end exceeds a range of data that can be indicated by the PDCP SNs, thereby resolving a problem that a receive end cannot correctly distinguish and process a plurality of data packets that have same SNs and that are received at the PDCP layer. After the transmit end consecutively sends, at the PDCP layer, a maximum quantity of PDCP PDUs that can be accommodated by the PDCP transmit window, if no status report about successful sending or successful receiving fed back by a lower layer (for example, the RLC layer) or the receive end is received, the transmit end no longer sends any PDCP PDU. When the transmit end uses an unacknowledged mode (UM) at the RLC layer, there may be no PDCP transmit window. The status report about successful sending herein is a status report fed back at the RLC layer by the transmit end, indicating that all or some PDCP PDUs are successfully sent, and the status report about successful receiving is a status report fed back by the receive end, indicating that all or some PDCP PDUs are successfully received.

A size of the PDCP transmit window may be preconfigured. Alternatively, a size of the PDCP transmit window may be determined based on an SN length. When the size of the PDCP transmit window is determined based on the SN length, the following formula may be used for the determining: $W=(L+1)/2$, where W denotes the size of the PDCP transmit window, and L denotes a value of a maximum SN that can be indicated by the SN length. For example, when the SN length is 10 bits, the maximum SN that can be indicated is 1023. Therefore, the size of the PDCP transmit window is $(1023+1)/2=512$.

S720. The transmit end receives, at the RLC layer, the PDCP PDU from the PDCP layer, uses the PDCP PDU as an RLC SDU, processes, at the RLC layer, the RLC SDU to form an RLC PDU, and sends the RLC PDU to a MAC layer.

In the existing technology, the transmit end may perform, at the RLC layer, two kinds of operations on the RLC SDU: concatenation and segmentation. In this embodiment, only segmentation processing is retained at the RLC layer, and concatenation processing is no longer performed on RLC SDUs. In this way, processing complexity and processing latency may be reduced. In addition, because the complexity is reduced, a requirement for an RLC PDU header is also lowered, and overheads of the RLC PDU header may be reduced.

For a process where the RLC layer processes a data packet from the PDCP layer, refer to the foregoing embodiments, and details are not described herein again.

In addition, an SN in the RLC PDU may be the SN delivered by the PDCP layer in step S710. In other words, the SN in the RLC PDU is the same as the PDCP SN. In this way, the PDCP layer and the RLC layer may share one SN to reduce header overheads. In addition, this resolves a problem that an SN length needs to be extended in the existing technology because a plurality of SNs is needed when the RLC SDU is segmented into a plurality of RLC PDUs, and therefore can also reduce overheads.

S730. The transmit end receives, at the MAC layer, an RLC data packet from the RLC layer, uses the RLC data packet as a MAC SDU, processes, at the MAC layer, the MAC SDU to form a MAC PDU, which is also referred to as a transport block (TB), and sends the MAC PDU to a physical layer.

It should be noted that the transmit end may receive, at the MAC layer, RLC data packets from one or more RLC layers, and each RLC layer corresponds to one radio bearer.

The MAC PDU includes a MAC header and a MAC payload, the MAC header includes a plurality of subheaders, and each subheader is used to indicate one MAC control element (CE) or one MAC SDU.

Figure 8:
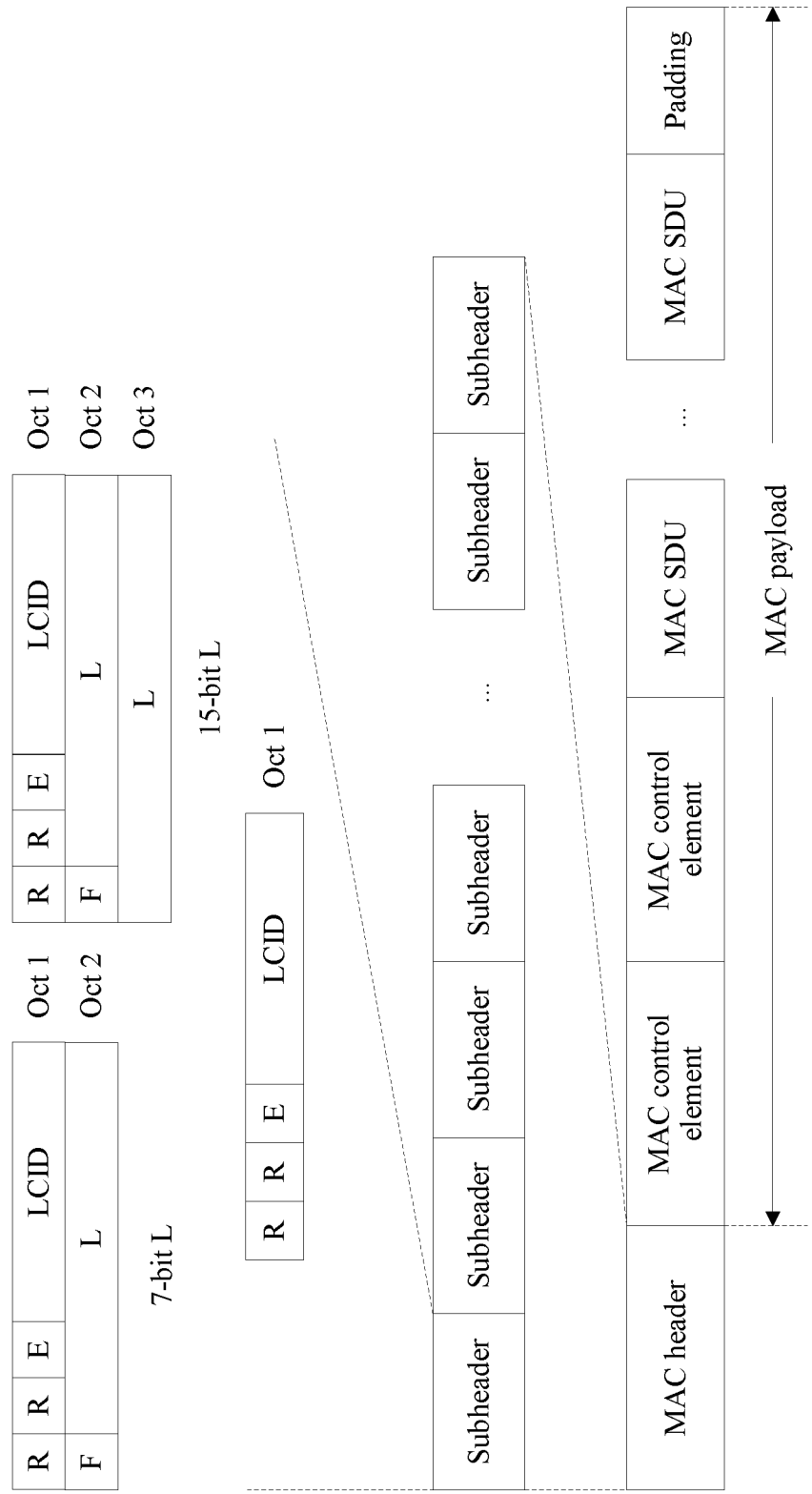
FIG. 8 is a schematic structural diagram of an existing MAC PDU.

Referring to FIG. 8, FIG. 8 is a schematic structural diagram of an existing MAC PDU. As shown in FIG. 8, generally, the MAC PDU includes a MAC header and a MAC payload. The MAC payload includes a MAC SDU and/or a MAC CE, and optionally, may further include a padding. For each MAC SDU, there is an associated subheader in a MAC header. A common MAC PDU subheader includes six fields (R/R/E/LCID/F/L) and may have two forms: one with a 7-bit L field and the other with a 15-bit L field. For a last subheader, a subheader corresponding to a MAC control element of a fixed length, and a subheader corresponding to the padding, four fields (R/R/E/LCID) are included. R is a reserved bit and is set to "0". E is used to indicate whether the MAC header has a plurality of fields. For example, when E=1, it means that what follows next is another group of "R/R/E/LCID" fields, and when E=0, it means that what follows next is the MAC payload. The logical channel identifier (LCD) is used to identify a logical channel from which a corresponding RLC PDU originates. F is used to indicate a length of the L field. L is used to indicate a length of the MAC SDU or a length of a control message.

In this embodiment of this application, a MAC PDU format the same as that in the existing technology may be used, and only content of the MAC SDU, namely, the RLC data packet, may be different from that in the existing technology. The RLC data packet may include a plurality of RLC PDUs in the foregoing format.

Optionally, in this embodiment of this application, a MAC PDU format different from that in the existing technology may be used, and a main difference is that a second extension field is added to the MAC header. The second extension field may be indicated as an H field or an E2 field (in this case, an original extension field may be indicated as an E1 field). The H field is used to indicate whether there is still an RLC data packet on a logical channel indicated by an LCID in a MAC subheader where the H field is located. For example, when the H field is 0, it represents that there is no RLC data packet on the logical channel, and when the H field is 1, it represents that there is an RLC data packet on the logical channel, or vice versa. That is, when the H field is 0, it represents that there is an RLC data packet on the logical channel, and when the H field is 1, it represents that there is no RLC data packet on the logical channel. In this way, only one LCID is needed to indicate data of a single logical channel. Therefore, header overheads are effectively reduced.

Figure 9:
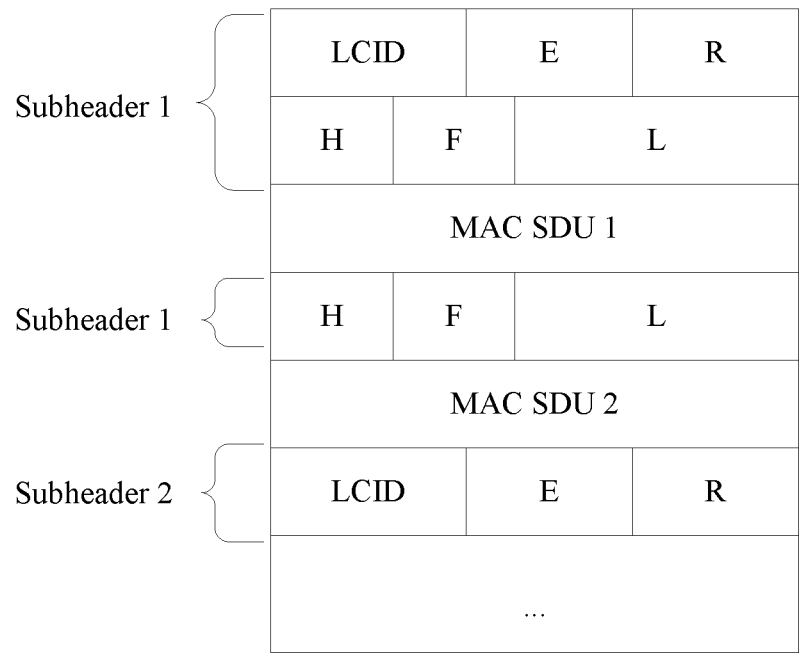
FIG. 9 is a schematic structural diagram of a MAC PDU according to an embodiment of this application.

Referring to FIG. 9, FIG. 9 is a schematic structural diagram of a MAC PDU according to an embodiment of this application. As shown in FIG. 9, the MAC PDU includes a MAC header and a MAC payload, the MAC header includes at least one subheader, and each subheader corresponds to one logical channel. The logical channel is indicated by an LCID field. In addition, a payload associated with each subheader may include one or more MAC SDUs, where some or all the MAC SDUs may be MAC CEs. Herein, for simplicity and convenience, only the MAC SDU is shown. Each subheader includes a first extension field and a second extension field, the first extension field is used to indicate whether the MAC PDU further includes another subheader or further includes data of another logical channel, and the second extension field is used to indicate whether the MAC PDU further includes other data of a logical channel corresponding to a subheader where the second extension field is located. In addition, the MAC subheader may further include an L field and an F field, and functions of the L field and the F field are similar to those in the existing technology.

As shown in FIG. 9, a subheader of the MAC PDU includes the following fields:

LCID field: used to indicate an RLC layer or a logical channel from which a payload associated with the subheader comes. It may be understood that payloads associated with the subheader, such as a MAC SDU 1 and a MAC SDU 2, come from a single RLC layer or a single logical channel. Because a MAC layer may generate its own data, for example, a MAC CE, the payload is also identified by using a corresponding LCD. Herein, only the MAC SDU is shown. A case about the MAC CE is similar.

E field: a first extension field, used to indicate whether the MAC PDU further includes another subheader, namely, whether the MAC PDU further includes data of another logical channel. For example, when E=0, it indicates that the MAC PDU does not have another subheader or data of another logical channel, and when E=1, it indicates that the MAC PDU includes another subheader or data of another logical channel, or vice versa.

R field: a reserved field.

H field: a second extension field, used to indicate whether the MAC PDU further includes other data of a logical channel corresponding to a subheader where the H field is located, That is, used to indicate whether there are other H/F/L fields. For example, when H=0, it represents that there are no other H/F/L fields, and when H=1, it represents that there are other H/F/L fields.

F field: used to indicate a length of the L field.

L field: used to indicate a length of the MAC SDU or a length of the MAC CE.

Optionally, the subheader of the MAC PDU includes one group of LCID/E/R fields, and one or more groups of H/F/L fields.

It should be noted that in addition to the format shown in FIG. 9, alternatively, subheaders may be centrally placed at the beginning of the MAC PDU, payloads associated with the subheader are placed at the later part of the MAC PDU based on a sequence of the corresponding subheaders, and there may be a padding field at the end. Alternatively, subheaders corresponding to a single LCID and payloads of the logical channel identified by the LCID may be centrally placed, with subheader information placed at the beginning, and the payloads placed later. For example, as shown in FIG. 9, two parts of a subheader 1 are centrally placed at the beginning, and MAC SDU 1 and MAC SDU 2 are centrally placed later.

According to a manner where subheaders are separated according to LCIDs, each time a receive end decodes a subheader at the MAC layer, a corresponding payload may be decoded, and a time from reception to processing is reduced. A manner of centrally placing the subheaders may comply with an existing standard, with relatively little modification.

S740. The transmit end sends data to a receive end through the physical layer.

S750. The receive end restores, at an MAC layer, a received MAC PDU to an MAC SDU, and sends the MAC SDU to an RLC layer.

Optionally, when both the receive end and the transmit end use an existing MAC PDU format, the receive end reassembles the MAC SDU based on the existing MAC PDU format. When both the receive end and the transmit end use the improved MAC PDU format in step S730, the receive end reassembles the MAC SDU based on the improved MAC PDU format.

After the MAC SDU is reassembled at the MAC layer, the receive end delivers, based on an LCD of a subheader corresponding to the MAC SDU, the MAC SDU to a corresponding RLC layer for processing.

S760. The receive end receives, at the RLC layer, the MAC SDU from the MAC layer, uses the MAC SDU as an RLC data packet, restores the received RLC data packet to an RLC SDU, and delivers the RLC SDU to a PDCP layer.

Similar to the foregoing description, the RLC data packet may include one RLC PDU or may include a plurality of RLC PDUs.

When the RLC PDU includes a complete RLC SDU, the transmit end delivers, at the RLC layer, the RLC SDU to the PDCP layer for processing. When the RLC PDU includes a segment of an RLC SDU, and all segments of the RLC SDU are successfully received at the RLC layer, the transmit end restores all the segments to the RLC SDU and delivers the RLC SDU to the PDCP layer for processing.

A format of the RLC PDU is the same as that in the foregoing description, and details are not described herein again.

Optionally, when the RLC SDU sent to the PDCP layer does not include a PDCP sequence number, the receive end sends an SN in an SN field in the RLC PDU to the PDCP layer. In other words, the receive end notifies the PDCP layer of an SN corresponding to the RLC SDU. The PDCP sequence number is a sequence number allocated to the PDCP PDU when the transmit end assembles the PDCP PDU. In this way, when the RLC SDU does not include a PDCP sequence number, the PDCP layer may perform, based on the SN delivered by the RLC layer, related processing, for example, one or more of operations such as reordering, a security-related operation, and header decompression.

Optionally, for an RLC unacknowledged mode (UM), the receive end maintains, at the RLC layer, a reordering window. A main function of the reordering window is that when an RLC PDU where a segment not restored to an RLC SDU is located falls out of the reordering window, the receive end discards, at the RLC layer, all received RLC PDUs corresponding to the RLC SDU. It may be understood that herein the falling out of the reordering window means falling out of a lower edge of the reordering window. Further, optionally, the receive end may notify the PDCP layer of a sequence number of the discarded RLC SDU.

When the receive end receives an updated RLC PDU (a corresponding SN exceeds an upper edge of the current reordering window), the receive end slides the reordering window to the SN corresponding to the RLC PDU or to a sequence number that is obtained by adding 1 to the SN corresponding to the RLC PDU. It may be understood that when an SN of a received RLC PDU falls within the reordering window, the receive end tries, at the RLC layer, to restore the RLC PDU to an RLC SDU and delivers the RLC SDU to the PDCP layer. When an SN of a received RLC PDU falls out of the reordering window, the receive end directly discards, at the RLC layer, the RLC PDU.

Optionally, when SNs of received RLC PDUs are discontinuous, the receive end starts an associated timer at a first discontinuous position. Before the associated timer expires, if RLC PDUs that include missing SNs are received, the receive end stops the associated timer. If the timer expires, and RLC PDUs that include missing SNs are not received, the receive end moves a lower edge of the reordering window to a position of an SN corresponding to a first RLC SDU that is not delivered to an upper layer and corresponding to the first discontinuous position, and discards an RLC PDU that is not delivered to the PDCP layer and whose SN is located before the SN. Further, optionally, the receive end may notify the PDCP layer of an SN of an RLC SDU corresponding to the discarded RLC PDU. For example, if SNs received by the receive end are 1, 2, 5, 6, 7, and 10 respectively, the first discontinuous position is a position of 5 or a position immediately followed by 5. In this case, an SN corresponding to the first discontinuous position may be marked as 5 or 4. The associated timer is started at the position of 5 or 4. If the associated timer for the position of 4 or 5 expires, the receive end moves the lower edge of the reordering window to a position whose corresponding SN is 8, and discards an RLC PDU that is not delivered to the PDCP layer and whose SN is located before 8. In this case, if SNs of received RLC PDUs are 1, 2, 5, 6, 7, and 10, the associated timer is started at the position of 9 or 10 again. In addition, a length of the associated timer may be configured by an upper layer or may be agreed, and this is not limited in this application.

Optionally, for an RLC acknowledged mode (AM), the receive end maintains, at the RLC layer, a reordering window. A main function of the reordering window is to execute an ARQ. A lower edge of the reordering window is a smallest SN in SNs of all RLC SDUs that are not delivered to the PDCP layer. It may be understood that when an SN of a received RLC PDU falls within the reordering window, the receive end tries, at the RLC layer, to restore the RLC PDU to an RLC SDU and delivers the RLC SDU to the PDCP layer. When an SN of a received RLC PDU falls out of the reordering window, the receive end directly discards, at the RLC layer, the RLC PDU.

Further, optionally, when SNs of received RLC PDUs are discontinuous, an associated timer is started at a first discontinuous position (at the position of 4 or 5 if received SNs are 1, 2, 5, 6, 7, and 10). Before the associated timer expires, if missing RLC PDUs are received, the associated timer stops. If the associated timer expires, an RLC status report is triggered.

When an RLC receive end feeds back the RLC status report, an assembly format of the RLC status report is as follows:

D/C field: Same as that in a data packet format. Details are not described herein.

ACK_SN: An SN reflected in the RLC status report and immediately following an SN of an RLC PDU that is received at the RLC layer by the receive end.

NACK_SN: An SN that is reflected in the RLC status report for an RLC PDU that fails to be received and that is before an SN of an RLC PDU received at the RLC layer by the receive end. In other words, at the RLC PDU transmit end, the RLC PDU indicated by NACK_SN is sent at the transmit end earlier than the RLC PDU indicated by ACK_SN.

SO_Start: When the receive end receives only a part (one or more segments) of one RLC SDU, SO_Start indicates a start byte of the received part.

SO_End: When the receive end receives only a part (one or more segments) of one RLC SDU, SO_End indicates an end byte of the received part.

Optionally, when a part of a single RLC SDU relates to two or more discontinuous segments, the part may be indicated in the following manner:

A combination of NACK_SN, SO_Start, and SO_End is used. Each missing segment is indicated by a combination of NACK_SN, SO_Start, and SO_End. An advantage is that the manner is simple; and a disadvantage is that there are two SNs for a single RLC SDU, and consequently overheads are relatively large.

Alternatively, one NACK_SN and a plurality of combinations of SO_Start and SO_End are used. An advantage is that overheads are relatively small. A disadvantage is that a packet format is relatively complex, and an indicator field is needed to indicate a quantity of combinations of SO_Start and SO_End in an RLC PDU corresponding to a NACK_SN, or to indicate whether there is another combination of SO_Start and SO_End following a combination of SO_Start and SO_End in an RLC PDU corresponding to a NACK_SN.

After receiving feedback from the RLC layer at the receive end, when the RLC layer at the transmit end retransmits a RLC PDU, if the complete RLC PDU cannot be sent by using a physical-layer resource, the transmit end may further segment the RLC PDU. A format of an RLC PDU after the segmentation is the same as the foregoing format of the RLC PDU, except that content of fields such as the SI field and the SO field changes. During retransmission, an RLC SDU or an RLC SDU segment that is included in a corresponding initially transmitted or previous retransmitted RLC PDU may be further divided into RLC SDU segments or smaller RLC SDU segments, or an RLC SDU segment included in a corresponding initially transmitted or previous retransmitted RLC PDU is further divided into smaller RLC SDU segments, or two or more continuous segments that belong to one RLC SDU are combined into one SDU segment or a complete SDU and encapsulated into one RLC PDU. In a word, it suffices if payloads of the RLC PDU come from one RLC SDU.

It may be learned that the receive end does not reorder, at the RLC layer, RLC PDUs, but directly delivers an RLC SDU to an upper layer provided that the RLC PDUs can be restored to the RLC SDU. Because the transmit end does not perform concatenation, processing at the receive end becomes quite simple and highly efficient, and processing latency is reduced. In addition, the receive end may maintain, at the RLC layer, a reordering window and/or an associated timer to determine whether a related RLC PDU needs to be discarded.

S770. The receive end receives, at the PDCP layer, the RLC SDU from the RLC layer, uses the RLC SDU as a PDCP PDU, restores the PDCP PDU to the PDCP SDU, and delivers the PDCP SDU to an upper layer for processing.

This process is the same as that in the existing technology, and details are not described herein.

Optionally, the receive end may maintain, at the PDCP layer, a reordering window that is used for in-order delivery at the PDCP layer. For example, when an SN of a received PDCP PDU falls out of the reordering window, the receive end discards, at the PDCP layer, the PDCP PDU, and when an SN of a received PDCP PDU falls within the reordering window, the receive end tries, at the PDCP layer, to restore the PDCP PDU to a PDCP SDU and delivers the PDCP SDU to the upper layer. It may be understood that herein the falling out of the reordering window means falling out of a lower edge of the reordering window.

Further, optionally, when SNs of received PDCP PDUs are discontinuous, the receive end starts an associated timer at a first discontinuous position (at 4 or 5 if the received SNs are 1, 2, 5, 6, 7, and 10). In addition, before the associated timer expires, if missing PDCP PDUs are received, the receive end stops the associated timer, and if the timer expires, the receive end moves a lower edge of the reordering window to a position of an SN corresponding to a first PDCP SDU that is not delivered to the upper layer and corresponding to the first discontinuous position, for example, moves the lower edge to 8. If the associated timer for 4 or 5 expires, the SNs of the received PDCP PDUs are 1, 2, 5, 6, 7, and 10. In this case, the associated timer is started at 9 or 10 again. A length of the associated timer is configured by the upper layer or fixed by the protocol, and this is not limited in this application.

After the PDCP layer receives information notified by the RLC layer that a data packet corresponding to an SN is no longer delivered, the PDCP layer no longer expects to receive the data packet. Therefore, a possible operation is to deliver continuous data packets following the SN to the upper layer. If an associated SN of an ongoing associated timer is smaller than a maximum SN of a data packet that has been delivered to the upper layer, the receive end stops the associated timer, and moves the associated timer to a position of an SN after the maximum SN and corresponding to a first PDCP SDU not delivered to the upper layer.

It may be learned that the receive end does not reorder, at the RLC layer, RLC PDUs, but directly delivers an RLC SDU to an upper layer provided that the RLC PDUs can be restored to the RLC SDU. The PDCP layer may perform processing, for example, decryption and header decompression, on a PDU that is first received. Compared with the existing technology, it is not necessary to wait for the RLC layer to perform reordering before delivering the RLC SDU for processing, and processing time is reduced.

It may be understood that an embodiment of this application may include one or more of the foregoing steps, for example, include one or more of the following steps: the step performed at the PDCP layer by the transmit end, the step performed at the RLC layer by the transmit end, the step performed at the MAC layer by the transmit end, the step performed at the MAC layer by the receive end, the step performed at the RLC layer by the receive end, the step performed at the PDCP layer by the receive end.

The methods disclosed in the foregoing embodiments may be performed by a network element on which the transmit end is located. For example, when the transmit end is located on a terminal, the foregoing methods may be performed by the terminal, and when the transmit end is located on a RAN side, the foregoing methods may be performed by a RAN device. In addition, the terminal or the RAN device includes a data processing apparatus, and the data processing apparatus includes units for performing the steps in any one of the foregoing methods.

Figure 10:
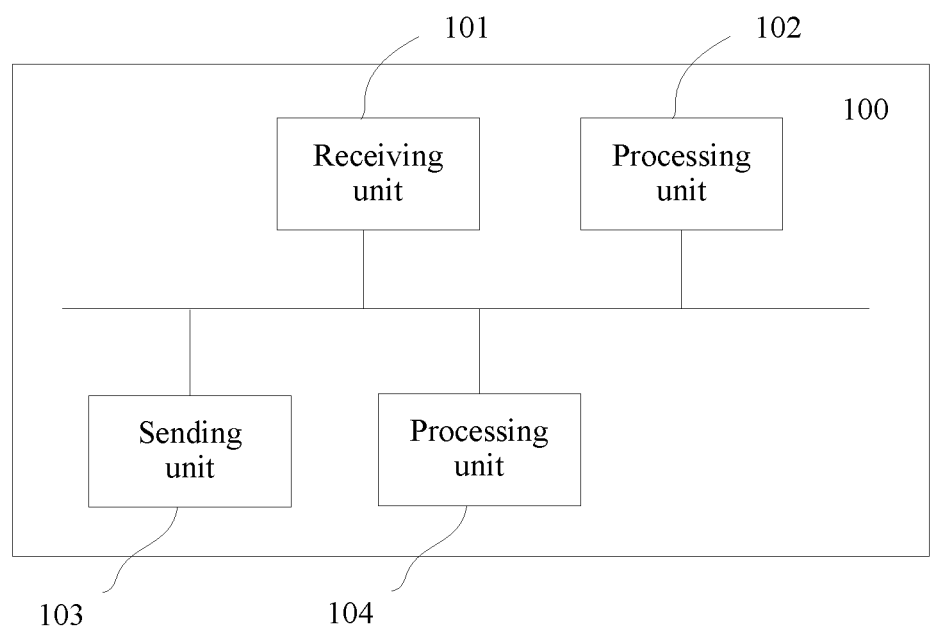
FIG. 10 is a schematic structural diagram of a data processing apparatus according to an embodiment of this application.

Referring to FIG. 10, FIG. 10 is a schematic structural diagram of a data processing apparatus according to an embodiment of this application. The apparatus is located at a transmit end, and is configured to perform some or all operations performed by the transmit end in the foregoing solutions. As shown in FIG. 10, the data processing apparatus 100 includes a receiving unit 101 and a processing unit 102. The receiving unit 101 is configured to receive a data packet from a PDCP layer, where the data packet is used as an RLC SDU. The processing unit 102 is configured to encapsulate the RLC SDU into at least one RLC PDU, where each the RLC PDU encapsulated at an RLC layer by the processing unit 102 includes a header and a payload, and the payload is used to carry data from a single RLC SDU.

Description about the header of the RLC PDU is the same as that in the foregoing embodiments, and details are not described herein again.

In addition, the processing unit 102 may encapsulate the RLC SDU into the at least one RLC PDU based on an indication from a MAC layer, or encapsulate the RLC SDU into the at least one RLC PDU based on a preset RLC PDU size. For details, refer to the description in the foregoing embodiments.

Still referring to FIG. 10, optionally, the data processing apparatus 100 may further include a sending unit 103, configured to send an RLC data packet to the MAC layer. The RLC data packet includes one or more RLC PDUs. Optionally, the data processing apparatus 100 may further include a processing unit 104, configured to use the RLC data packet as a MAC SDU and encapsulate the MAC SDU into a MAC PDU. The MAC PDU includes a MAC header and a MAC payload, the MAC header includes at least one subheader, each subheader corresponds to one logical channel, the subheader includes a first extension field and a second extension field, the first extension field is used to indicate whether the MAC PDU further includes another subheader or further includes data of another logical channel, and the second extension field is used to indicate whether the MAC PDU further includes other data of a logical channel corresponding to a subheader where the second extension field is located.

It should be noted that when the MAC layer and the RLC layer are arranged on different physical entities, the data processing apparatus 100 may not include the processing unit 104, and the RLC data packet is sent to the MAC layer located on another physical entity, for processing.

Figure 11:
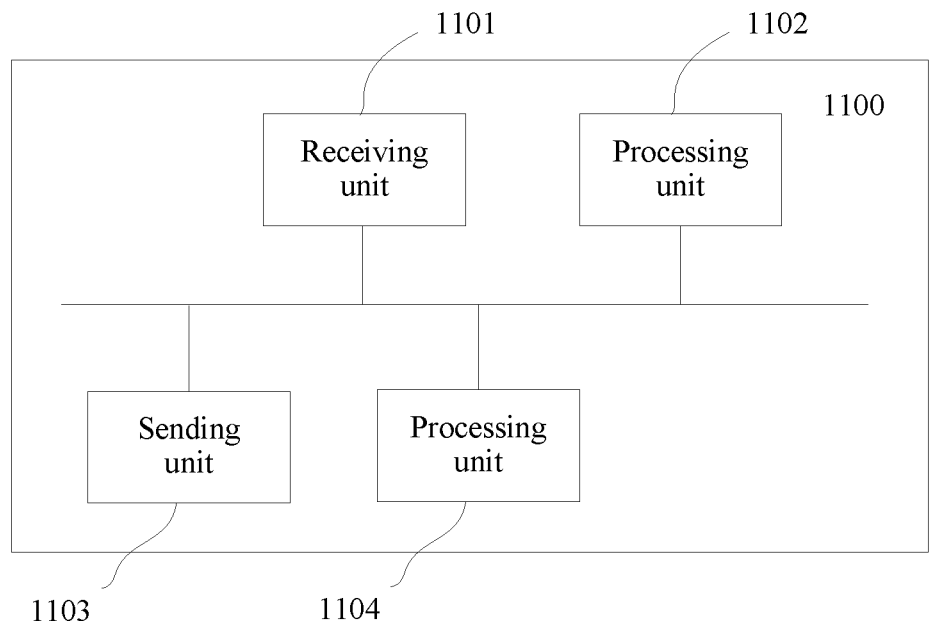
FIG. 11 is a schematic structural diagram of a data processing apparatus according to an embodiment of this application.

Referring to FIG. 11, FIG. 11 is a schematic structural diagram of a data processing apparatus according to an embodiment of this application. The apparatus is located at a receive end, and is configured to perform some or all operations performed by the receive end in the foregoing solutions. As shown in FIG. 11, the data processing apparatus 1100 includes a receiving unit 1101, a processing unit 1102, and a sending unit 1103. The receiving unit 1101 is configured to receive, at an RLC layer, a data packet from a MAC layer, where the data packet includes an RLC PDU, the RLC PDU includes a header and a payload, and the payload is used to carry data from a single RLC SDU. The processing unit 1102 is configured to: when determining, based on the header of the RLC PDU, that the payload of the RLC PDU is a complete RLC SDU, obtain the RLC SDU, and the sending unit 1103 is configured to send the RLC SDU to a PDCP layer; or the processing unit 1102 is configured to: when determining, based on the header of the RLC PDU, that the payload of the RLC PDU is a segment of an RLC SDU, obtain all segments of the RLC SDU and restore all the segments to the RLC SDU, and the sending unit 1103 is configured to send the RLC SDU to a PDCP layer.

Description about the header of the RLC PDU is the same as that in the foregoing embodiments, and details are not described herein again.

Optionally, when the RLC SDU sent to the PDCP layer does not include a PDCP SN, the sending unit 1103 is further configured to send an SN in the RLC PDU to the PDCP layer.

Optionally, the data processing apparatus 1100 further includes a processing unit 1104, configured to: before the receiving unit 1101 receives the data packet from the MAC layer, obtain, at the MAC layer, a MAC SDU based on a format of a MAC PDU, and use the MAC SDU as the data packet sent to the RLC layer. The format of the MAC PDU is the same as that in the foregoing embodiments, and details are not described herein again.

It should be noted that when the MAC layer and the RLC layer are arranged on different physical entities, the data processing apparatus 1100 may not include the processing unit 1104, and the RLC data packet is sent to the MAC layer located on another physical entity, for processing.

It should be understood that division of the units in the foregoing data processing apparatus 100 is merely logical function division. In actual implementation, all or some of the units may be integrated into one physical entity, or the units may be physically separated. In addition, these units may all be implemented in the form of software invoked by using a processing element, or may all be implemented in the form of hardware, or some units may be implemented in the form of software invoked by using a processing element and some units be implemented in the form of hardware. For example, the processing unit may be an independently disposed processing element, or may be integrated into a chip of a RAN device or a terminal, for implementation. In addition, the processing unit may be stored, in the form of a program, in a memory of a RAN device or a terminal, and be invoked by a processing element in the RAN device or the terminal, to perform the functions of the foregoing units. Implementation of other units is similar to this. In addition, all or some of these units may be integrated or these units may be implemented separately. The processing element herein may be an integrated circuit and have a signal processing capability. In an implementation process, the steps of the foregoing methods or the foregoing units may be performed by an integrated logical circuit in the form of hardware in the processing unit or by an instruction in the form of software in the processing unit.

For example, the foregoing units may be configured as one or more integrated circuits that perform the foregoing methods, for example, one or more application-specific integrated circuits (ASIC), one or more microprocessors (digital signal processor, DSP), or one or more field programmable gate arrays (FPGA). For another example, when one of the foregoing units is implemented in the form of a program invoked by using a processing element, the processing element may be a general purpose processor, for example, a central processing unit (CPU), or another processor that can invoke the program. For another example, these units may be integrated together and implemented in the form of a System-On-a-Chip (SOC).

Implementation of the units of the data processing apparatus 1100 is similar to this, and details are not described herein.

In addition, alternatively, data processing performed at the PDCP layer by the transmit end may be implemented by a data processing apparatus, and the data processing apparatus includes units that perform all or some of the steps performed at the PDCP layer by the transmit end in the foregoing embodiments. Likewise, alternatively, data processing performed at the PDCP layer by the receive end may be implemented by a data processing apparatus, and the data processing apparatus includes units that perform all or some of the steps performed at the PDCP layer by the receive end in the foregoing embodiments.

Likewise, alternatively, data processing performed at the MAC layer by the transmit end may be implemented by a data processing apparatus, and the data processing apparatus includes units that perform all or some of the steps performed at the MAC layer by the transmit end in the foregoing embodiments. Likewise, alternatively, data processing performed at the MAC layer by the receive end may be implemented by a data processing apparatus, and the data processing apparatus includes units that perform all or some of the steps performed at the MAC layer by the receive end in the foregoing embodiments.

Figure 12:
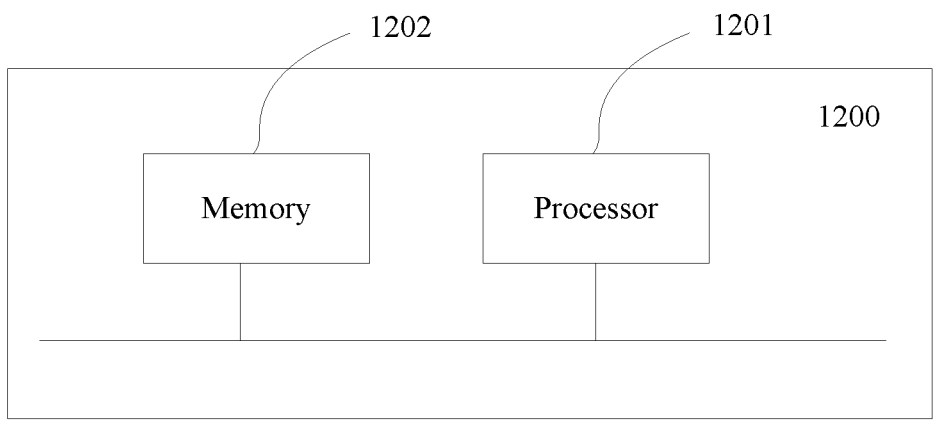
FIG. 12 is a schematic structural diagram of a data processing apparatus according to an embodiment of this application.

Referring to FIG. 12, FIG. 12 is a schematic structural diagram of a data processing apparatus according to an embodiment of this application. As shown in FIG. 12, the data processing apparatus 1200 includes a processor 1201 and a memory 1202. The processor 1201 invokes a program stored in the memory 1202, to perform all or some of the steps performed by the transmit end or the receive end in the foregoing embodiments, for example, the operations performed at any one of the PDCP layer, the RLC layer, and the MAC layer by the transmit end in the foregoing embodiments, or the operations performed at any one of the PDCP layer, the RLC layer, and the MAC layer by the receive end in the foregoing embodiments.

Figure 13:
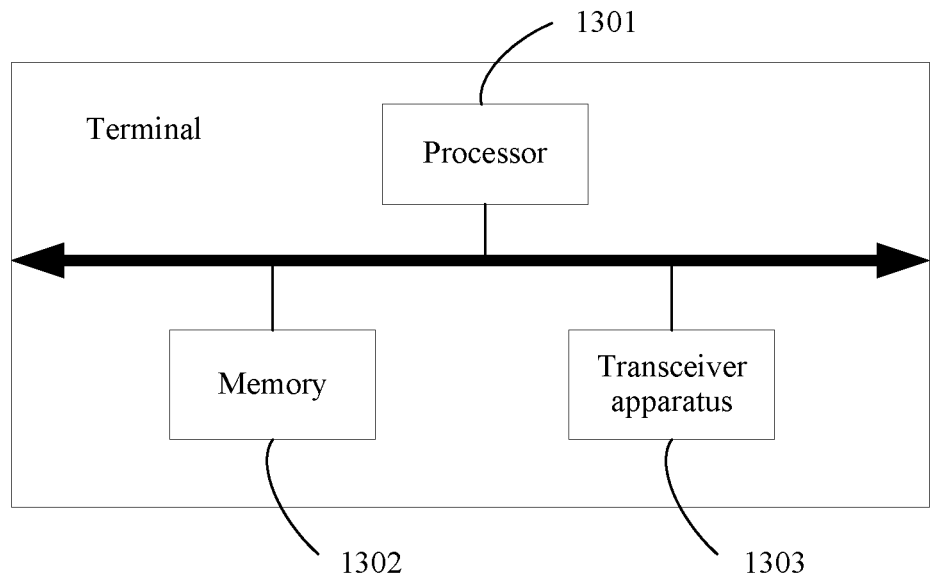
FIG. 13 is a schematic structural diagram of a terminal according to an embodiment of this application.

Referring to FIG. 13, FIG. 13 is a schematic structural diagram of a terminal according to an embodiment of this application. As shown in FIG. 13, the terminal includes a processor 1301, a memory 1302, and a transceiver apparatus 1303. The transceiver apparatus 1303 may be connected to an antenna. In a downlink direction, the transceiver apparatus 1303 receives, by using the antenna, information sent by a RAN device, and sends the information to the processor 1301 for processing. In an uplink direction, the processor 1301 processes data of the terminal, and sends the data to the RAN device by using the transceiver apparatus 1303.

When the terminal is a transmit end, the terminal includes any one of the foregoing data processing apparatuses configured to perform the operations of the transmit end, for example, the data processing apparatus shown in FIG. 10 or FIG. 12. The units in FIG. 10 may be implemented by using the processor 1301 to invoke program code in the memory 1302, or may be integrated into a chip in the terminal.

When the terminal is a receive end, the terminal includes any one of the foregoing data processing apparatuses configured to perform the operations of the receive end, for example, the data processing apparatus shown in FIG. 11 or FIG. 12. The units in FIG. 11 may be implemented by using the processor 1301 to invoke program code in the memory 1302, or may be integrated into a chip in the terminal.

Figure 14:
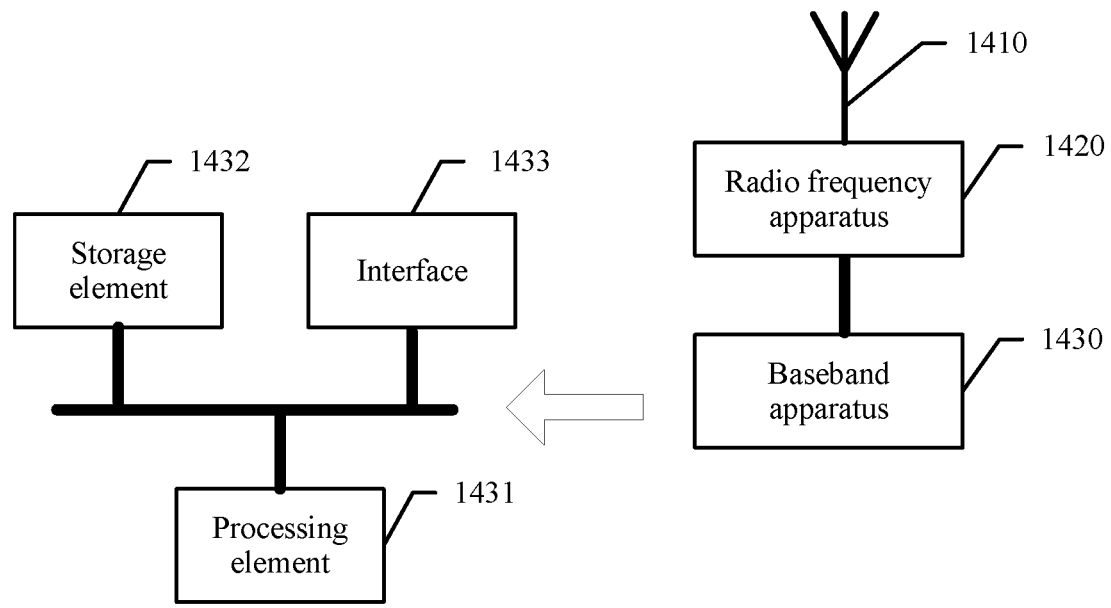
FIG. 14 is a schematic structural diagram of a RAN device according to an embodiment of this application.

Referring to FIG. 14, FIG. 14 is a schematic structural diagram of a RAN device according to an embodiment of this application. As shown in FIG. 14, the RAN device includes an antenna 1410, a radio frequency apparatus 1420, and a baseband apparatus 1430. The antenna 1410 is connected to the radio frequency apparatus 1420. In an uplink direction, the radio frequency apparatus 1420 receives, by using the antenna 1410, information sent by a terminal, and sends, to the baseband apparatus 1430 for processing, the information sent by the terminal. In a downlink direction, the baseband apparatus 1430 processes the information of the terminal and sends processed information to the radio frequency apparatus 1420, and the radio frequency apparatus 1420 sends processed information to the terminal by using the antenna 1410 after processing the information of the terminal.

When the RAN device is a transmit end, the RAN device includes any one of the foregoing data processing apparatuses configured to perform the operations of the transmit end, and the data processing apparatus is located in the baseband apparatus 1430. For example, the data processing apparatus shown in FIG. 10 or FIG. 12 may be located in the baseband apparatus 1430.

In an implementation, the units shown in FIG. 10 are implemented by using a processing element to invoke a program. For example, the baseband apparatus 1430 includes a processing element 1431 and a storage element 1432, and the processing element 1431 invokes a program stored in the storage element 1432, to implement the functions of the units. In addition, the baseband apparatus 1430 may further include an interface 1433, configured to exchange information with the radio frequency apparatus 1420. The interface is, for example, a common public radio interface (CPRI).

In another implementation, these units may be configured as one or more processing elements, and these processing elements are arranged on the baseband apparatus 1430. The processing element herein may be an integrated circuit, for example, one or more ASICs, one or more DSPs, or one or more FPGAs. These integrated circuits may be integrated to form a chip.

For example, the foregoing units may be integrated together and implemented in the form of a System-On-a-Chip (SOC). For example, the baseband apparatus 1430 includes an SOC chip, configured to implement the foregoing units.

Same as that in the foregoing description, the processing element herein may be a general purpose processor, for example, a central processing unit (CPU), or may be configured as one or more integrated circuits that perform the foregoing methods, for example, one or more ASICs, one or more DSPs, or one or more FPGAs.

The storage element may be a memory, or may be a general name for a plurality of storage elements.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

In addition, in the existing technology, a measurement gap is used to temporarily interrupt communication of a current serving cell when the terminal performs inter-frequency measurement. The measurement gap is configured at a granularity of a terminal. After the configuration, the measurement is performed at a granularity of a terminal. That is, when an RAN device configures, for a terminal, a measurement gap parameter, such as a measurement gap period and a measurement gap offset, the terminal does not receive, during a corresponding measurement gap period, information in the current serving cell or at a current serving frequency. However, this affects normal communication between the terminal and the current serving cell. Therefore, an embodiment of this application provides a measurement gap at a granularity of a carrier. However, currently, there is no method for configuring the measurement gap at the granularity of a carrier.

Figure 15:
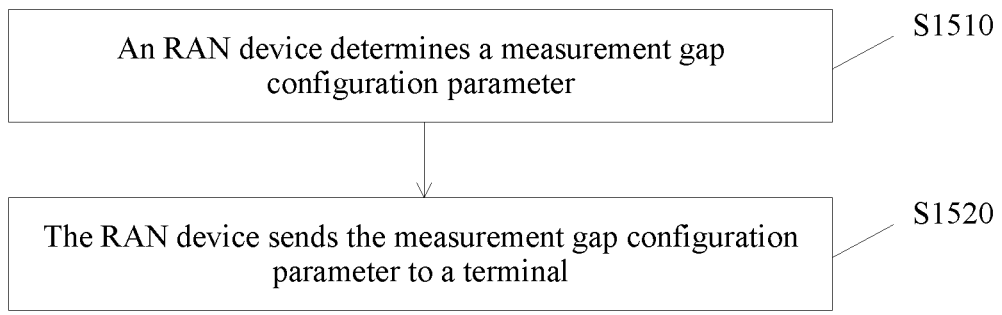
FIG. 15 is a schematic diagram of a method for configuring a measurement gap parameter according to an embodiment of this application.

An embodiment of this application provides a method for configuring a measurement gap parameter. The method is used on a RAN device. In other words, the method is performed by the RAN device. Referring to FIG. 15, the method includes the following steps.

S1510. The RAN device determines a measurement gap configuration parameter.

The measurement gap configuration parameter includes at least the following:

information about one or more measurement frequencies or measurement bands;

information about one or more serving cells (or information about one or more serving frequencies, or information about one or more serving bands) where information can be normally received and sent when the terminal measures one or more measurement frequencies or measurement bands, namely, information receiving and sending cannot be performed in other serving cells (or serving frequencies or serving bands); or information about one or more serving cells (or information about one or more serving frequencies, or information about one or more serving bands) where information cannot be normally received and sent when the terminal measures one or more measurement frequencies or measurement bands; and measurement gap pattern information, for example, a measurement gap period and a measurement gap offset, where optionally, the measurement gap pattern information further includes measurement gap length information (for example, 6 ms, 4 ms, or 3 ms).

Optionally, the foregoing measurement gap parameter further includes information about one or more serving cells (or information about one or more serving frequencies, or information about one or more serving bands) where information can be received and sent in part of time when the terminal measures one or more measurement frequencies or measurement bands. That information can be received and sent in part of time means that: the terminal can receive and send information in the one or more current serving cells (or at the one or more serving frequencies, or in the one or more serving bands) within a measurement period, except for a time period needed for the terminal to adjust a radio frequency from a frequency corresponding to the information about the one or more current serving cells (or the information about the one or more serving frequencies, or the information about the one or more serving bands) to a frequency at which the one or more measurement frequencies or measurement bands can be measured, and except for a time period needed for the terminal to adjust a radio frequency from a frequency at which the one or more measurement frequencies or measurement bands can be measured to a frequency corresponding to the information about the one or more current serving cells (or the information about the one or more serving frequencies, or the information about the one or more serving bands). For example, according to measurement gap parameter information, the terminal needs to measure a frequency f1 during moments 0 to 5, and the terminal currently works at a frequency of f2. It is assumed that the terminal needs to take 1 ms to adjust a radio frequency from f2 to a frequency at which f1 can be measured, and the terminal needs to take 1 ms to adjust the radio frequency from the frequency at which f1 can be measured back to f2. Therefore, a time during which the terminal can receive and send information at f1 are moments 1 to 4. Alternatively, the foregoing measurement gap parameter includes information about one or more serving cells (or information about one or more serving frequencies, or information about one or more serving bands) where information cannot be received and sent in part of time when the terminal measures one or more measurement frequencies or measurement bands.

Optionally, when the information about the one or more serving cells (or the information about the one or more serving frequencies, or the information about the one or more serving bands) where information can be received and sent in part of time in the foregoing measurement gap is information about all current serving cells (or the information about the one or more serving frequencies, or the information about the one or more serving bands), the information about the one or more serving cells may be identified by "all", and the information about all the current serving cells (or the information about the one or more serving frequencies, or the information about the one or more serving bands) is not listed.

Optionally, the measurement gap parameter further includes a measurement gap pattern identity. The measurement gap pattern identity is associated with the foregoing plurality of parameters.

For example, mapping relationships are shown in Table 1.

TABLE 1

| Measurement gap pattern 1 (Period: 40 ms; length: 6 ms) | Measurement frequency (or band) 1 | Information is normally received and sent in a current serving cell 1 (or at a serving frequency 1, or in a serving band 1). |
| Measurement gap pattern 2 (Period: 80 ms; length: 6 ms) | Measurement frequency (or band) 2 | Information is normally received and sent in a current serving cell 1 (or at a serving frequency 1, or in a serving band 1). Information is normally received and sent in a current serving cell 2 (or at a serving frequency 2, or in a serving band 2). |
| Measurement gap pattern 3 (Period: 40 ms; length: 4 ms) | Measurement frequency (or band) 3 | Information is normally received and sent in a current serving cell 1 (or at a serving frequency 1, or in a serving band 1) in part of time. |

S1520. The RAN device sends the measurement gap configuration parameter to a terminal.

Specifically, the measurement gap configuration parameter is included in a radio resource control (RRC) message.

According to this embodiment of this application, when the terminal measures different frequencies or bands, information can still be received and sent in the one or more current serving cells. This increases a time of communication between the terminal and the RAN device, and improves a data rate of the terminal.

Correspondingly, an embodiment of this application further provides a RAN device, including units configured to perform the method steps shown in FIG. 15. Implementation of the units is the same as described in the foregoing embodiments. The units may be implemented by using a processor to invoke a program stored in a memory, or may be integrated into one or more integrated circuits or chips for implementation. In addition, for a structure of the RAN device, refer to FIG. 14.

Another embodiment of this application provides a method for configuring a measurement gap parameter. The method is used on a terminal. In other words, the method is performed by the terminal. The method includes the following steps.

S1610. The terminal receives a measurement gap configuration parameter.

The measurement gap configuration parameter includes at least the following:

information about one or more measurement frequencies or measurement bands;

information about one or more serving cells (or information about one or more serving frequencies, or information about one or more serving bands) where information can be normally received and sent when the terminal measures one or more measurement frequencies or measurement bands, namely, information receiving and sending cannot be performed in other serving cells (or serving frequencies or serving bands); or information about one or more serving cells (or information about one or more serving frequencies, or information about one or more serving bands) where information cannot be normally received and sent when the terminal measures one or more measurement frequencies or measurement bands; and measurement gap pattern information, for example, a measurement gap period and a measurement gap offset, where optionally, the measurement gap pattern information further includes measurement gap length information (for example, 6 ms, 4 ms, or 3 ms).

Optionally, the foregoing measurement gap parameter further includes information about one or more serving cells (or information about one or more serving frequencies, or information about one or more serving bands) where information can be received and sent in part of time when the terminal measures one or more measurement frequencies or measurement bands. That information can be received and sent in part of time means that: the terminal can receive and send information in the one or more current serving cells (or at the one or more serving frequencies, or in the one or more serving bands) within a measurement period, except for a time period needed for the terminal to adjust a radio frequency from a frequency corresponding to the information about the one or more current serving cells (or the information about the one or more serving frequencies, or the information about the one or more serving bands) to a frequency at which the one or more measurement frequencies or measurement bands can be measured, and except for a time period needed for the terminal to adjust a radio frequency from a frequency at which the one or more measurement frequencies or measurement bands can be measured to a frequency corresponding to the information about the one or more current serving cells (or the information about the one or more serving frequencies, or the information about the one or more serving bands). For example, according to measurement gap parameter information, the terminal needs to measure a frequency f1 during moments 0 to 5, and the terminal currently works at a frequency of f2. It is assumed that the terminal needs to take 1 ms to adjust a radio frequency from f2 to a frequency at which f1 can be measured, and the terminal needs to take 1 ms to adjust the radio frequency from the frequency at which f1 can be measured back to f2. Therefore, a time during which the terminal can receive and send information at f1 are moments 1 to 4. Alternatively, the foregoing measurement gap parameter includes information about one or more serving cells (or information about one or more serving frequencies, or information about one or more serving bands) where information cannot be received and sent in part of time when the terminal measures one or more measurement frequencies or measurement bands.

Optionally, when the information about the one or more serving cells (or the information about the one or more serving frequencies, or the information about the one or more serving bands) where information can be received and sent in part of time in the foregoing measurement gap is information about all current serving cells (or the information about the one or more serving frequencies, or the information about the one or more serving bands), the information about the one or more serving cells may be identified by "all", and the information about all the current serving cells (or the information about the one or more serving frequencies, or the information about the one or more serving bands) is not listed.

Optionally, the measurement gap parameter further includes a measurement gap pattern identity. The measurement gap pattern identity is associated with the foregoing plurality of parameters.

For example, mapping relationships are shown below.

| | | |
|---|---|---|
| Measurement gap pattern 1 (Period: 40 ms; length: 6 ms) | Measurement frequency (or band) 1 | Information is normally received and sent in a current serving cell 1 (or at a serving frequency 1, or in a serving band 1). |
| Measurement gap pattern 2 (Period: 80 ms; length: 6 ms) | Measurement frequency (or band) 2 | Information is normally received and sent in a current serving cell 1 (or at a serving frequency 1, or in a serving band 1). Information is normally received and sent in a current serving cell 2 (or at a serving frequency 2, or in a serving band 2). |
| Measurement gap pattern 3 (Period: 40 ms; length: 4 ms) | Measurement frequency (or band) 3 | Information is normally received and sent in a current serving cell 1 (or at a serving frequency 1, or in a serving band 1) in part of time. |

Specifically, the measurement gap configuration parameter is included in a radio resource control (RRC) message.

S1620. The terminal performs measurement by using the measurement gap configuration parameter.

According to this embodiment of this application, when the terminal measures different frequencies or bands, information can still be received and sent on the one or more current serving cells. This increases a time of communication between the terminal and the RAN device, and improves a data rate of the terminal.

Figure 16:
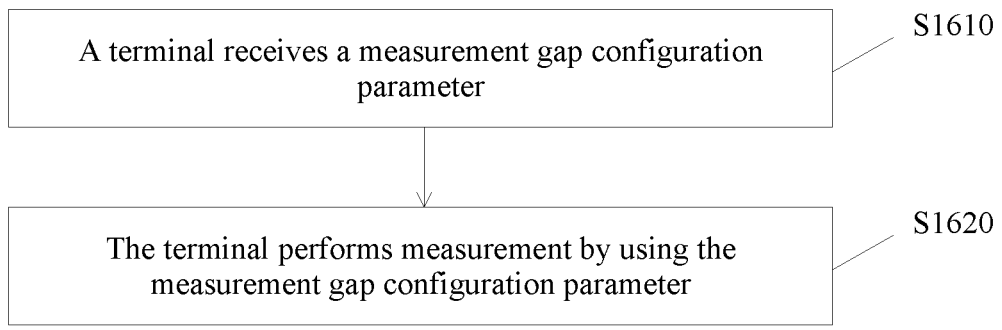
FIG. 16 is a schematic diagram of a method for configuring a measurement gap parameter according to an embodiment of this application.

Correspondingly, an embodiment of this application further provides a terminal, including units configured to perform the method steps shown in FIG. 16. Implementation of the units is the same as described in the foregoing embodiments. The units may be implemented by using a processor to invoke a program stored in a memory, or may be integrated into one or more integrated circuits or chips for implementation. In addition, for a structure of the terminal, refer to FIG. 13.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data processing method by a data sending apparatus, comprising:
   receiving, at a Radio Link Control (RLC) layer, a data packet from a Packet Data Convergence Protocol (PDCP) layer, wherein the data packet is used as a first RLC service data unit (SDU); and
   encapsulating, at the RLC layer, the first RLC SDU into at least one RLC protocol data unit (PDU),
   wherein each one of the at least one RLC PDU comprises:
      a header, and
      a payload carrying data from the first RLC SDU,
   wherein the at least one RLC PDU comprises a first RLC PDU and a second RLC PDU,
   wherein the header of the first RLC PDU comprises a segment indicator (SI) field with two bits,
   wherein a first value of the two bits of the SI field in the header of the first RLC PDU indicates that the payload of the first RLC PDU comprises a first segment of the first RLC SDU,
   wherein the payload of the first RLC PDU comprises the first segment of the first RLC SDU,
   wherein the header of the second RLC PDU comprises:
      an SI field with two bits, and
      a segment offset (SO) field,
   wherein a second value of the two bits of the SI field in the header of the second RLC PDU indicates that the payload of the second RLC PDU comprises a last segment of the first RLC SDU,
   wherein the payload of the second RLC PDU comprises the last segment of the first RLC SDU, and
   wherein an offset value in the SO field in the header of the second RLC PDU indicates a byte offset within the first RLC SDU corresponding to the first byte in the payload of the second RLC PDU.

2. The method according to claim 1, wherein the header of the first RLC PDU comprises a sequence number (SN) field, the header of the second RLC PDU comprises a SN field, and the SN fields of the first RLC PDU and the second RLC PDU carry a same SN.

3. The method according to claim 1, wherein the encapsulating the first RLC SDU into at least one RLC PDU comprises:
   encapsulating the first RLC SDU into the at least one RLC PDU based on an indication from a Media Access Control (MAC) layer.

4. The method according to claim 1, further comprising:
   receiving feedback from a data receiving apparatus that a transmitted RLC PDU is not correctly received, and in response to the receiving feedback:
      further segmenting, at the RLC layer, the payload in the transmitted RLC PDU into a plurality of RLC PDUs, and
      retransmitting the payload in the plurality of RLC PDUs.

5. The method according to claim 1, wherein the data sending apparatus maintains, at the PDCP layer, a PDCP transmit window, and wherein the method further comprises:
   sending, at the PDCP layer by the data sending apparatus, PDCP PDUs to the RLC layer; and
   stopping, by the data sending apparatus, sending another PDCP PDU to the RLC layer in response to a quantity of the sent PDCP PDUs reaching a maximum quantity of PDCP PDUs that can be accommodated by the PDCP transmit window and not receiving a successful feedback at the PDCP layer.

6. The method according to claim 1, wherein the at least one RLC PDU further comprises a third RLC PDU, and
the header of the third RLC PDU comprises an SI field with two bits and an SO field, the SI field, in the header of the third RLC PDU, has a third value indicating that the payload of the third RLC PDU comprises a middle segment of the first RLC SDU, and the payload of the third RLC PDU comprises the middle segment of the first RLC SDU; and the SO field, in the header of the third RLC PDU, indicates a byte offset, of a first byte in the payload of the third RLC PDU, within the first RLC SDU.

7. The method according to claim 6, wherein the header of each of the first RLC PDU, the second RLC PDU, and the third RLC PDU comprises an SN field, and the SN fields of the first RLC PDU the second RLC PDU, and the third RLC PDU carry a same SN.

8. The method according to claim 1, further comprising:
receiving, at the RLC layer, another data packet from the PDCP layer, wherein the another data packet is used as a second RLC SDU;
encapsulating, at the RLC layer, the second RLC SDU into a fourth RLC PDU, wherein the fourth RLC PDU comprises a header and a payload, the header of the fourth RLC PDU comprises an SI field with two bits, the SI field, in the header of the fourth RLC PDU, has a fourth value indicating that the payload of the fourth RLC PDU comprises the complete second RLC SDU, and the payload of the fourth RLC PDU comprises the complete second RLC SDU.

9. The method according to claim 8, wherein the header of the fourth RLC PDU comprises an SN field or no SN field.

10. An apparatus, comprising a processor, configured to connect with a non-transitory computer readable medium, wherein the non-transitory computer readable medium stores computer-executable instructions that, when executed by the processor, facilitate the apparatus performing a method comprising:
receiving, at an Radio Link Control (RLC) layer, a data packet from a Packet Data Convergence Protocol (PDCP) layer, wherein the data packet is used as a first RLC service data unit (SDU); and
encapsulating, at the RLC layer, the first RLC SDU into at least one RLC protocol data unit (PDU),
wherein each one of the at least one RLC PDU comprises:
a header, and
a payload carrying data from the first RLC SDU,
wherein the at least one RLC PDU comprises a first RLC PDU and a second RLC PDU,
wherein the header of the first RLC PDU comprises a segment indicator (SI) field with two bits,
wherein a first value of the two bits of the SI field in the header of the first RLC PDU indicates that the payload of the first RLC PDU comprises a first segment of the first RLC SDU,
wherein the payload of the first RLC PDU comprises the first segment of the first RLC SDU;
wherein the header of the second RLC PDU comprises:
an SI field with two bits, and
a segment offset (SO) field,
wherein a second value of the two bits of the SI field in the header of the second RLC PDU indicates that the payload of the second RLC PDU comprises a last segment of the first RLC SDU,
wherein the payload of the second RLC PDU comprises the last segment of the first RLC SDU, and
wherein an offset value in the SO field in the header of the second RLC PDU indicates a byte offset within the first RLC SDU corresponding to the first byte in the payload of the second RLC PDU.

11. The apparatus according to claim 10, wherein the header of the first RLC PDU comprises a sequence number (SN) field, and the header of the second RLC PDU comprises a SN field, and an SN in the SN field of the first RLC PDU is the same as an SN in the SN field in the second RLC PDU.

12. The apparatus according to claim 10, wherein the encapsulating the first RLC SDU into at least one RLC PDU comprises:
encapsulating the first RLC SDU into the at least one RLC PDU based on an indication from a Media Access Control (MAC) layer.

13. The apparatus according to claim 10, wherein the method facilitated by execution of the computer-executable instructions by the processor further comprises:
receiving feedback from a data receiving apparatus that a transmitted RLC PDU is not correctly received, and in response to the receiving feedback:
further segmenting, at the RLC layer, the payload in the transmitted RLC PDU into a plurality of RLC PDUs, and
retransmitting the payload in the plurality of RLC PDUs.

14. The apparatus according to claim 10, wherein a PDCP transmit window is maintained at the PDCP layer, and wherein the method facilitated by execution of the computer-executable instructions by the processor further comprises:
sending, at the PDCP layer, PDCP PDUs to the RLC layer; and
stopping sending another PDCP PDU to the RLC layer in response to a quantity of the sent PDCP PDUs reaching a maximum quantity of PDCP PDUs that can be accommodated by the PDCP transmit window and not receiving a successful feedback at the PDCP layer.

15. The apparatus according to claim 10, wherein the at least one RLC PDU further comprises a third RLC PDU, and
the header of the third RLC PDU comprises an SI field with two bits and an SO field, the SI field, in the header of the third RLC PDU, has a third value indicating that the payload of the third RLC PDU comprises a middle segment of the first RLC SDU, and the payload of the third RLC PDU comprises the middle segment of the first RLC SDU; and the SO field, in the header of the third RLC PDU, indicates a byte offset, of a first byte in the payload of the third RLC PDU, within the first RLC SDU.

16. The apparatus according to claim 15, wherein the header of each of the first RLC PDU, the second RLC PDU, and the third RLC PDU comprises an SN field, and the SN fields of the first RLC PDU the second RLC PDU, and the third RLC PDU carry a same SN.

17. The apparatus according to claim 10, the method facilitated by execution of the computer-executable instructions by the processor further comprises:
receiving, at the RLC layer, another data packet from the PDCP layer, wherein the another data packet is used as a second RLC SDU;
encapsulating, at the RLC layer, the second RLC SDU into a fourth RLC PDU, wherein the fourth RLC PDU comprises a header and a payload, the header of the fourth RLC PDU comprises an SI field with two bits, the SI field, in the header of the fourth RLC PDU, has a fourth value indicating that the payload of the fourth RLC PDU comprises the complete second RLC SDU, and the payload of the fourth RLC PDU comprises the complete second RLC SDU.

18. The apparatus according to claim 17, wherein the header of the fourth RLC PDU comprises an SN field or no SN field.

19. A non-transitory computer readable storage medium comprising computer-executable instructions such that, when executed by a processor, facilitate performing a method comprising:
- receiving, at an Radio Link Control (RLC) layer, a data packet from a Packet Data Convergence Protocol (PDCP) layer, wherein the data packet is used as a first RLC service data unit (SDU); and
- encapsulating, at the RLC layer, the first RLC SDU into at least one RLC protocol data unit (PDU),
- wherein each one of the at least one RLC PDU comprises:
  - a header, and
  - a payload carrying data from the first RLC SDU,
- wherein the at least one RLC PDU comprises a first RLC PDU and a second RLC PDU,
- wherein the header of the first RLC PDU comprises a segment indicator (SI) field with two bits,
- wherein a first value of the two bits of the SI field in the header of the first RLC PDU indicates that the payload of the first RLC PDU comprises a first segment of the first RLC SDU,
- wherein the payload of the first RLC PDU comprises the first segment of the first RLC SDU,
- wherein the header of the second RLC PDU comprises:
  - an SI field with two bits, and
  - a segment offset (SO) field,
- wherein a second value of the two bits of the SI field in the header of the second RLC PDU indicates that the payload of the second RLC PDU comprises a last segment of the first RLC SDU,
- wherein the payload of the second RLC PDU comprises the last segment of the first RLC SDU, and
- wherein an offset value in the SO field in the header of the second RLC PDU indicates a byte offset within the first RLC SDU corresponding to the first byte in the payload of the second RLC PDU the payload carries data from a single RLC SDU.

* * * * *